United States Patent
Hirzallah et al.

(10) Patent No.: US 12,432,784 B2
(45) Date of Patent: Sep. 30, 2025

(54) RANDOM ACCESS PREAMBLE TECHNIQUES IN FULL-DUPLEX WIRELESS COMMUNICATIONS

(71) Applicant: QUALCOMM Incorporated, San Diego, CA (US)

(72) Inventors: Mohammed Ali Mohammed Hirzallah, San Diego, CA (US); Ahmed Attia Abotabl, San Diego, CA (US); Ahmed Elshafie, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 532 days.

(21) Appl. No.: 18/049,933

(22) Filed: Oct. 26, 2022

(65) Prior Publication Data

US 2024/0147534 A1   May 2, 2024

(51) Int. Cl.
    *H04W 74/0833*  (2024.01)
    *H04L 5/14*     (2006.01)
    *H04W 16/14*    (2009.01)
    *H04W 52/10*    (2009.01)

(52) U.S. Cl.
    CPC ........... *H04W 74/0833* (2013.01); *H04L 5/14* (2013.01); *H04W 16/14* (2013.01); *H04W 52/10* (2013.01)

(58) Field of Classification Search
    None
    See application file for complete search history.

(56) References Cited

U.S. PATENT DOCUMENTS

| | | | | |
|---|---|---|---|---|
| 2007/0165578 A1* | 7/2007 | Yee | ...................... | H04B 7/2603 370/337 |
| 2007/0268848 A1* | 11/2007 | Khandekar | .......... | H04B 7/2656 370/295 |
| 2017/0367058 A1* | 12/2017 | Pelletier | ............ | H04W 72/0446 |
| 2019/0014548 A1* | 1/2019 | Pelletier | ................ | H04W 76/27 |
| 2019/0116582 A1* | 4/2019 | Pelletier | ................ | H04W 72/51 |
| 2019/0174554 A1* | 6/2019 | Deenoo | ............... | H04W 68/005 |
| 2019/0320467 A1* | 10/2019 | Freda | ................... | H04W 74/004 |
| 2020/0266908 A1* | 8/2020 | Qian | ...................... | H04L 5/0007 |
| 2021/0105833 A1* | 4/2021 | Freda | ................ | H04W 74/0833 |
| 2024/0147534 A1* | 5/2024 | Hirzallah | ............... | H04W 16/14 |

* cited by examiner

*Primary Examiner* — Faiyazkhan Ghafoerkhan
(74) *Attorney, Agent, or Firm* — Dalei Dong; Holland & Hart LLP

(57) ABSTRACT

Methods, systems, and devices for wireless communications are described that provide for mitigation of interference related to full-duplex communications for random access channel (RACH) initial access procedures in shared radio frequency spectrum. A user equipment (UE) may send different RACH preambles subsequent to a channel access procedure, based on whether full-duplex communications or half-duplex communications are being used at a corresponding network entity. The different RACH preambles may include a longer RACH preamble that is used when full-duplex is present, and a shorter RACH preamble that is used when full-duplex is not present. The shorter or longer RACH preamble may be used, for example, based at least in part on an open-loop transmit power for the RACH procedure, a RACH occasion configuration that provides different preamble lengths for different RACH occasions, a full-duplexing type that is being used, or any combinations thereof.

30 Claims, 16 Drawing Sheets

Configuration Information (e.g., MIB/SIB) 215

DL Transmission (1ˢᵗ Set Of Resources) 220

RACH Transmission (1ˢᵗ Set of Resources) 225

RANDOM ACCESS PREAMBLE TECHNIQUES IN FULL-DUPLEX WIRELESS COMMUNICATIONS

FIELD OF TECHNOLOGY

The following relates to wireless communications, including random access preamble techniques in full-duplex wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, certain devices (e.g., base stations, transmission-reception points, radio heads, or other network entities) may operate in a full-duplex mode in which the device transmits signals and receives signals using a same set of wireless resources (e.g., a same or overlapping set of time and frequency resources). Efficient techniques for reliable communications when a device is operating in full-duplex mode can help to enhance network efficiency, enhance network throughput, and create an enhanced user experience.

SUMMARY

The described techniques relate to improved methods, systems, devices, and apparatuses that support random access preamble techniques in full-duplex wireless communications. In accordance with various aspects, described techniques provide for mitigation of interference related to full-duplex communications for random access channel (RACH) initial access procedures. In some aspects, a user equipment (UE) may send different RACH preambles subsequent to a channel access procedure in a shared radio frequency spectrum band, based on whether full-duplex communications or half-duplex communications are being used at a network entity. The different RACH preambles may include longer RACH preamble that is used when full-duplex is present, and a shorter RACH preamble that is used when full-duplex is not present for the associated RACH communications. In some cases, the shorter RACH preamble may be used unless an open-loop transmit power for the RACH procedure exceeds a threshold value that indicates the longer RACH preamble may be transmitted. Additionally, or alternatively, the network entity may configure different RACH occasions with different preamble lengths, based on whether the full-duplex operating mode is used during an associated RACH occasion. Additionally, or alternatively, multiple different preamble lengths may be configured based on a full-duplexing type that is being used, where different length preambles are used for partially-overlapping versus fully-overlapping full-duplex.

A method for wireless communication at a user equipment (UE) is described. The method may include receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources and transmitting, in a first random access occasion subsequent to a channel access procedure for a shared radio frequency spectrum band used for communications with the cell, a first random access request having the second random access preamble length based on the first random access occasion being associated with full-duplex communications of the cell.

An apparatus for wireless communication at a UE is described. The apparatus may include a processor, memory coupled with the processor, and instructions stored in the memory. The instructions may be executable by the processor to cause the apparatus to receive configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources and transmit, in a first random access occasion subsequent to a channel access procedure for a shared radio frequency spectrum band used for communications with the cell, a first random access request having the second random access preamble length based on the first random access occasion being associated with full-duplex communications of the cell.

Another apparatus for wireless communication at a UE is described. The apparatus may include means for receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources and means for transmitting, in a first random access occasion subsequent to a channel access procedure for a shared radio frequency spectrum band used for communications with the cell, a first random access request having the second random access preamble length based on the first random access occasion being associated with full-duplex communications of the cell.

A non-transitory computer-readable medium storing code for wireless communication at a UE is described. The code may include instructions executable by a processor to receive configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources and transmit, in a first random access occasion subsequent to a channel access procedure for a shared radio frequency spectrum band used for communications with the cell, a first random access request having the second random access preamble length based on the first random access occasion being associated with full-duplex communications of the cell.

Some examples of the method, apparatuses, and non-transitory computer-readable medium described herein may further include operations, features, means, or instructions for determining a random access transmit power for the first random access request based on a full-duplex power offset associated with the first random access occasion, and where the first random access request is transmitted using the random access transmit power. In some examples of the method, apparatuses, and non-transitory computer-readable medium described herein, the full-duplex power offset mitigates self-interference associated with the full-duplex communications of the cell. In some examples of the method, apparatuses, and non-transitory computer-readable medium described herein, the full-duplex power offset may be received with the configuration information in a master information block message, in a system information block message, or any combinations thereof.

Some examples of the method, apparatuses, and non-transitory computer-readable medium described herein may further include operations, features, means, or instructions for determining a random access transmit power for the first random access request based on an open-loop power control procedure for random access transmissions and selecting the second random access preamble length for the first random access request based on the random access transmit power being at or above a threshold value, where the first random access preamble length is selected for one or more random access requests based on the random access transmit power being below the threshold value. In some examples of the method, apparatuses, and non-transitory computer-readable medium described herein, the threshold value for the random access transmit power is based on a regulatory maximum transmit power for communications in a shared or unlicensed radio frequency spectrum band.

In some examples of the method, apparatuses, and non-transitory computer-readable medium described herein, the configuration information includes an indication of a first subset of random access occasions associated with the first random access preamble length and a second subset of random access occasions associated with the second random access preamble length, and where the second random access preamble length is selected for the first random access request based on the first random access occasion being included in the second subset of random access occasions. In some examples of the method, apparatuses, and non-transitory computer-readable medium described herein, the first random access preamble length and the second random access preamble length is provided with the configuration information in a master information block message, in a system information block message, or any combinations thereof. Some examples of the method, apparatuses, and non-transitory computer-readable medium described herein may further include operations, features, means, or instructions for determining a transmit power for the first random access request based on the first random access occasion being included in the second subset of random access occasions, where the first subset of random access occasions are configured with a different transmit power than the second subset of random access occasions. In some examples of the method, apparatuses, and non-transitory computer-readable medium described herein, the configuration information includes information for two or more random access occasions having different random access preamble lengths within a same slot, a same set of frequency resources, or both.

In some examples of the method, apparatuses, and non-transitory computer-readable medium described herein, the configuration information includes a first set of random access preambles associated with a first subband full-duplex (SBFD) slot format and a second set of random access preambles associated with a second SBFD slot format, and where a first random access preamble is selected for the first random access request based at least on part on whether a slot associated with the first random access occasion is associated with the first SBFD format or the second SBFD format. In some examples of the method, apparatuses, and non-transitory computer-readable medium described herein, the first set of random access preambles have a different preamble length than the second set of random access preambles.

A method for wireless communication at a network entity is described. The method may include transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources and receiving, from the UE in a first random access occasion subsequent to a channel access procedure for a shared radio frequency spectrum band used for communications with the UE, a first random access request having the second random access preamble length based on the first random access occasion being associated with full-duplex communications of the cell.

An apparatus for wireless communication at a network entity is described. The apparatus may include a processor, memory coupled with the processor, and instructions stored in the memory. The instructions may be executable by the processor to cause the apparatus to transmit configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources and receive, from the UE in a first random access occasion subsequent to a channel access procedure for a shared radio frequency spectrum band used for communications with the UE, a first random access request having the second random access preamble length based on the first random access occasion being associated with full-duplex communications of the cell.

Another apparatus for wireless communication at a network entity is described. The apparatus may include means for transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources and means for receiving, from the UE in a first random access occasion subsequent to a channel access procedure for a shared radio frequency spectrum band used for communications with the UE, a first random access request having the second random access preamble length based on the first random access occasion being associated with full-duplex communications of the cell.

A non-transitory computer-readable medium storing code for wireless communication at a network entity is described. The code may include instructions executable by a processor to transmit configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources and receive, from the UE in a first random access occasion subsequent to a channel access procedure for a shared radio frequency spectrum band used for communications with the UE, a first random access request having the second random access preamble length based on the first random access occasion being associated with full-duplex communications of the cell.

In some examples of the method, apparatuses, and non-transitory computer-readable medium described herein, the configuration information indicates a random access transmit power for the first random access request that is based on a full-duplex power offset associated with the first random access occasion. In some examples of the method, apparatuses, and non-transitory computer-readable medium described herein, the full-duplex power offset mitigates self-interference associated with the full-duplex communications of the cell. In some examples of the method, apparatuses, and non-transitory computer-readable medium described herein, the full-duplex power offset may be transmitted with the configuration information in a master information block message, in a system information block message, or any combinations thereof.

In some examples of the method, apparatuses, and non-transitory computer-readable medium described herein, the configuration information indicates a random access configuration having an open-loop power control procedure that provides a random access transmit power for the first random access request, and where the first random access preamble length is used for random access requests when the random access transmit power is below a threshold value, and the second random access preamble length is used for random access requests when the random access transmit power is at or above the threshold value. In some examples of the method, apparatuses, and non-transitory computer-readable medium described herein, the threshold value for the random access transmit power is based on a regulatory maximum transmit power for communications in a shared or unlicensed radio frequency spectrum band.

In some examples of the method, apparatuses, and non-transitory computer-readable medium described herein, the configuration information includes an indication of a first subset of random access occasions associated with the first random access preamble length and a second subset of random access occasions associated with the second random access preamble length, and where the second random access preamble length is selected for the first random access request based on the first random access occasion being included in the second subset of random access occasions. In some examples of the method, apparatuses, and non-transitory computer-readable medium described herein, the first random access preamble length and the second random access preamble length may be provided with the configuration information in a master information block message, in a system information block message, or any combinations thereof.

In some examples of the method, apparatuses, and non-transitory computer-readable medium described herein, the configuration information indicates a transmit power for the first random access request based on the first random access occasion being included in the second subset of random access occasions, where the first subset of random access occasions is configured with a different transmit power than the second subset of random access occasions. In some examples of the method, apparatuses, and non-transitory computer-readable medium described herein, the configuration information includes information for two or more random access occasions having different random access preamble lengths within a same slot, a same set of frequency resources, or both.

In some examples of the method, apparatuses, and non-transitory computer-readable medium described herein, the configuration information includes a first set of random access preambles associated with a first SBFD slot format and a second set of random access preambles associated with a second SBFD slot format, and where a random access preamble is selected for a random access request based at least on part on whether a slot for transmission of the random access request is associated with the first SBFD format or the second SBFD format. In some examples of the method, apparatuses, and non-transitory computer-readable medium described herein, the first set of random access preambles have a different preamble length than the second set of random access preambles.

DETAILED DESCRIPTION

Figure 1:
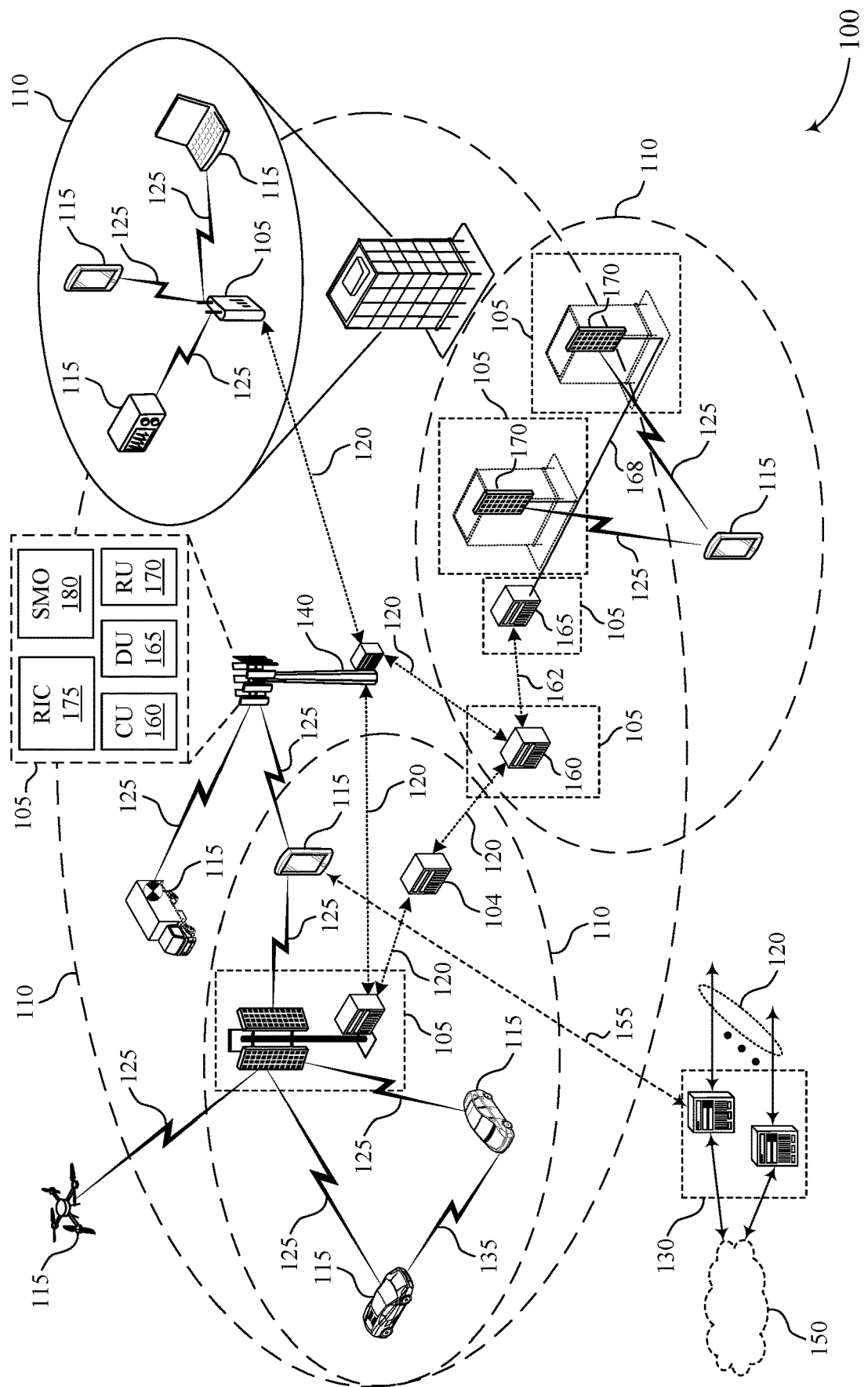
FIG. 1 illustrates an example of a wireless communications system that supports random access preamble techniques in full-duplex wireless communications in accordance with one or more aspects of the present disclosure.

In some systems, one or more devices, such as a network entity or a user equipment (UE), may operate in a full-duplex mode in which the device transmits signals and receives signals using a same or at least partially overlapping set of wireless resources (e.g., a same set of time and frequency resources). When a device is operating in full-duplex mode, concurrent transmission and reception may result in self-interference where transmitted signals interfere with signals that are to be concurrently received, cross-link interference (CLI) from other transmitters, or both. Such interference may reduce the likelihood of successful reception and decoding of communications, and various techniques to mitigate such interference may be implemented in order to enhance reliability of communications. For example, one technique to mitigate interference is to have a transmitting device transmit at a higher power during periods of full-duplex operation. Such increased transmit power (e.g., from a user equipment (UE)) may substantially mitigate self-interference at the receiving device (e.g., a network entity), but may be unnecessary for transmissions when half-duplex communications are used. Further, some wireless network deployments may use shared radio frequency spectrum (e.g., unlicensed radio frequency spectrum or radio frequency spectrum that is shared among two or more operators), where a maximum transmit power is limited (e.g., due to regulatory limits on transmit power). In such deployments, a device may be unable to increase transmit power sufficiently to overcome interference that may be present due to full-duplex communications.

Other interference mitigation techniques may include, for example, adjusting a modulation order, a coding rate, or both, of communications to enhance the likelihood of successful decoding at a receiving device. For example, if a transmission is made during a period when a receiving device is performing full-duplex communications, a lower modulation order (e.g., QPSK instead of 16 QAM or higher) may be used relative to transmissions when the receiving device is performing half-duplex communications. However, in cases where a device (e.g., a UE) is performing an access procedure (e.g., a random access channel (RACH) procedure), an initial transmission may be include a RACH preamble that is transmitted using a configured modulation order, according to an open-loop power control procedure. When operating in a shared radio frequency spectrum band, a transmit power for a RACH transmission (e.g., a random access request) may be constrained, and the RACH preamble may not provide sufficient redundancy (e.g., multiple instances of a random access sequence) to be reliably decoded.

Various aspects of the present disclosure provide for mitigation of interference related to full-duplex communications for RACH access procedures. In accordance with some aspects, a UE may transmit different RACH preambles to a network entity based on whether full-duplex is being used at the network entity. For example, a longer RACH preamble may be used when full-duplex is present, and a shorter RACH preamble may be used when full-duplex is not present. In some cases, the shorter RACH preamble may be used unless an open-loop transmit power for the RACH procedure exceeds a threshold value, and then the longer RACH preamble may be transmitted. The transmit power threshold value, a full-duplex power offset, or both may be configured, and the preamble length for a random access request may be selected based on whether a computed transmit power for the RACH transmission exceeds the threshold value. Additionally, or alternatively, the network entity may configure different RACH occasions with different preamble lengths, based on whether the full-duplex operating mode is used on the particular RACH occasion. Additionally, or alternatively, multiple different preamble lengths may be configured based on a full-duplexing type that is being used, where different length preambles are used for partially-overlapping versus fully-overlapping full-duplex.

Techniques as discussed herein may thus provide for mitigation of interference related to full-duplex communications for RACH initial access procedures, such as in shared radio frequency spectrum. Such techniques may help to enhance reliability of RACH transmissions in full-duplex communications (e.g., to mitigate self-interference and/or CLI in full-duplex slots). Such techniques thus enhance network efficiency through reduced overhead, enhance reliability and throughput through mitigation of interference in RACH communications, provide for reduced power consumption through fewer retransmissions, and provide for enhanced user experience Aspects of the disclosure are initially described in the context of wireless communications systems. Aspects of the disclosure are further illustrated by and described with reference to random access resource diagrams, process flows, apparatus diagrams, system diagrams, and flowcharts that relate to random access preamble techniques in full-duplex wireless communications.

FIG. 1 illustrates an example of a wireless communications system 100 that supports random access preamble techniques in full-duplex wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support random access preamble techniques in full-duplex wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, in accordance with various aspects as discussed herein, a UE 115 may transmit different RACH preambles to a network entity 105 based on whether full-duplex is being used at the network entity 105. For example, a longer RACH preamble may be used when full-duplex is present, and a shorter RACH preamble may be used when full-duplex is not present. In some cases, the shorter RACH preamble may be used when an open-loop transmit power for the RACH procedure is less than or equal to a threshold value, and the longer RACH preamble may be transmitted when the open-loop transmit power for the RACH procedure exceeds the threshold value. In some examples, the transmit power threshold value, a full-duplex power offset, or both may be configured, and the preamble length for a random access request may be selected based on whether a computed transmit power for the RACH transmission exceeds the threshold value. Additionally, or alternatively, the network entity 105 may configure different RACH occasions with different preamble lengths, based on whether the full-duplex operating mode is used on the particular RACH occasion. Additionally, or alternatively, multiple different preamble lengths may be configured based on a full-duplexing type that is being used, where different length preambles are used for partially-overlapping versus fully-overlapping full-duplex.

Figure 2:
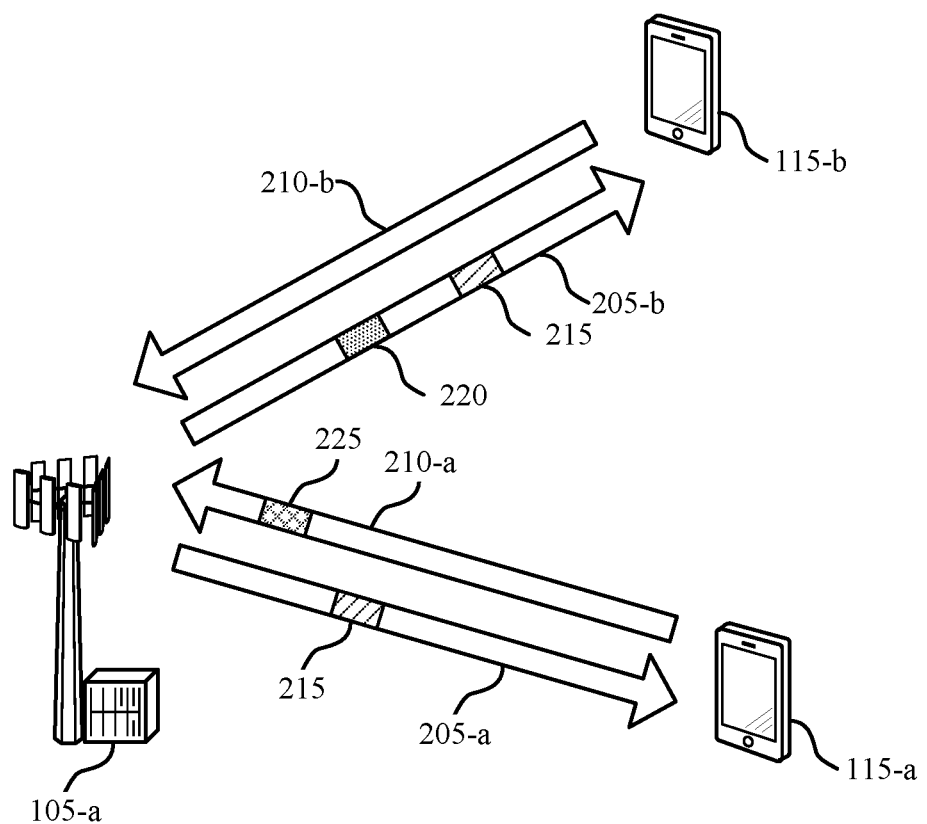
FIG. 2 illustrates an example of a wireless communications system that supports random access preamble techniques in full-duplex wireless communications in accordance with one or more aspects of the present disclosure.
Figure 2:
Figure 2:
Figure 2:

FIG. 2 illustrates an example of a wireless communications system 200 that supports random access preamble techniques in full-duplex wireless communications in accordance with one or more aspects of the present disclosure. The wireless communications system 200 may include a network entity 105-a, a first UE 115-a, and a second UE 115-b, which may represent examples of a network entity 105 and UE 115 as described with reference to FIG. 1.

In this example, the first UE 115-a may communicate with the network entity 105-a via a first downlink carrier 205-a and a first uplink carrier 210-a (e.g., which may be different carriers operating using FDD, or a same carrier operating using TDD). The second UE 115-b may communicate with the network entity 105-a via a second downlink carrier 205-b and a second uplink carrier 210-b. In the example of FIG. 2, the network entity 105-a, for at least some communications, may operate in a full-duplex mode in which a first set of resources may be used for both uplink and downlink communications. For example, a RACH transmission 225 from the first UE 115-a is received concurrently with a downlink transmission 220 to the second UE 115-b (e.g., using a same set of time and frequency resources).

As discussed herein, the full-duplex communications at the network entity 105-a (e.g., sub-band full-duplex (SBFD) or in-band full-duplex (IBFD)) may result in residual self-interference (RSI), cross-link interference (CLI), or both, that affect reception of the RACH transmission 225. As discussed above, one option to mitigate RSI/CLI is to apply power offset to RACH transmission 225, however, such a solution might not be feasible in shared frequency bands (e.g., unlicensed bands) due to regulatory mandated transmit power constraints. In accordance with various aspects of the present disclosure, the first UE 115-a may transmit different length RACH preambles to account for RSI/CLI at the network entity 105-a. In some aspects, increasing the length of the RACH preamble may help mitigate RSI/CLI without excessively increasing transmit power. In some cases, a cell may be configured with multiple preamble formats of different lengths (e.g., one for half-duplex and another for full-duplex) when operating over shared radio frequency bands.

In some cases, a transmit power of the RACH transmission 225 may be set at the first UE 115-a based on a pathloss (PL) estimation (e.g., from a reference signal transmitted from the network entity 105-a) and a target preamble reception power at the network entity 105-a. In some case, the transmit power may not account for interference associated with full-duplex communications at the network entity 105-a. In the event that a response to an initial RACH transmission 225 is not received at the first UE 115-a, the preamble transmit power can be ramped up using a configurable offset in accordance with an open-loop power control procedure that is associated with a random access procedure. In some cases, different length preambles may be selected based on the determined uplink transmit power.

In accordance with some aspects, the network entity 105-a may configure a cell with two or more RACH preamble formats with different preamble lengths that account for self-interference. For example, a first preamble length ($L_{RA}$) may be configured for half-duplex operation, and a second preamble length $L_{RA-FD}$) may be configured for full-duplex operation. In some cases, a target received power of the RACH transmission 225 (e.g, $P_t^{(tg)}$) may be used by the first UE 115-a to compute a transmit power for a $j^{th}$ RACH transmission 225 ($P_t^{(j)}$) based on the following formula:

$$P_t^{(j)} = PL + P_t^{(tg)} + \Delta_j + \Delta_{FD},$$

where $\Delta_{FD}$ is a configurable power offset that accounts for self-interference at the network entity 105-a, PL is the pathloss estimation determined at the first UE 115-a, and $\Delta_j$ is power ramping offset at the $j^{th}$ transmission in accordance with the open-loop power control procedure. In some cases, a value of $\Delta_{FD}$ may be signaled by the network entity 105-a in configuration information 215 (e.g., in a master information block (MIB), in a system information block (SIB), or any combinations thereof). Further, in some cases as discussed herein, a maximum transmit power may be constrained for communications using shared radio frequency spectrum (e.g. a regulatory maximum), and $P_{max}$ may correspond to such a maximum transmit power (e.g., set by the Federal Communications Commission (FCC) or European Telecommunications Standards Institute (ETSI)). In some cases, for the $j^{th}$ RACH transmission 225, the first UE 115-a may follow the following rule:

IF $P_t^{(j)} < P_{max}$, the UE 115-a uses a first preamble length (e.g., $L_{RA}$)

ELSE, the first UE 115-a proceeds with a second preamble length (e.g., $L_{RA-FD}$) with updated transmit power $\tilde{P}_t^{(j)} = PL + P_t^{(tg)} + \Delta_j$.

Such techniques may provide that a relatively shorter preamble length may be used in cases where an available uplink transmit power can accommodate an increase in transmit power to account for full-duplex interference, which enhances likelihood of successful reception and consumes less overhead then a longer preamble length. The longer preamble length then may be used to mitigate interference when the uplink transmit power is constrained, which enhances the likelihood of successful reception of the RACH transmission 225, and consumes additional overhead than the shorter preamble length only in the event of uplink transmit power constraint. In other cases, additionally or alternatively, the network entity 105-a may configure certain RACH occasions for different preamble lengths, may configure RACH preamble lengths based on a type of full-duplex communications (e.g., SBFD or IBFD), or any combinations thereof. Various examples of such techniques are discussed with reference to the examples of FIG. 3.

Figure 3:
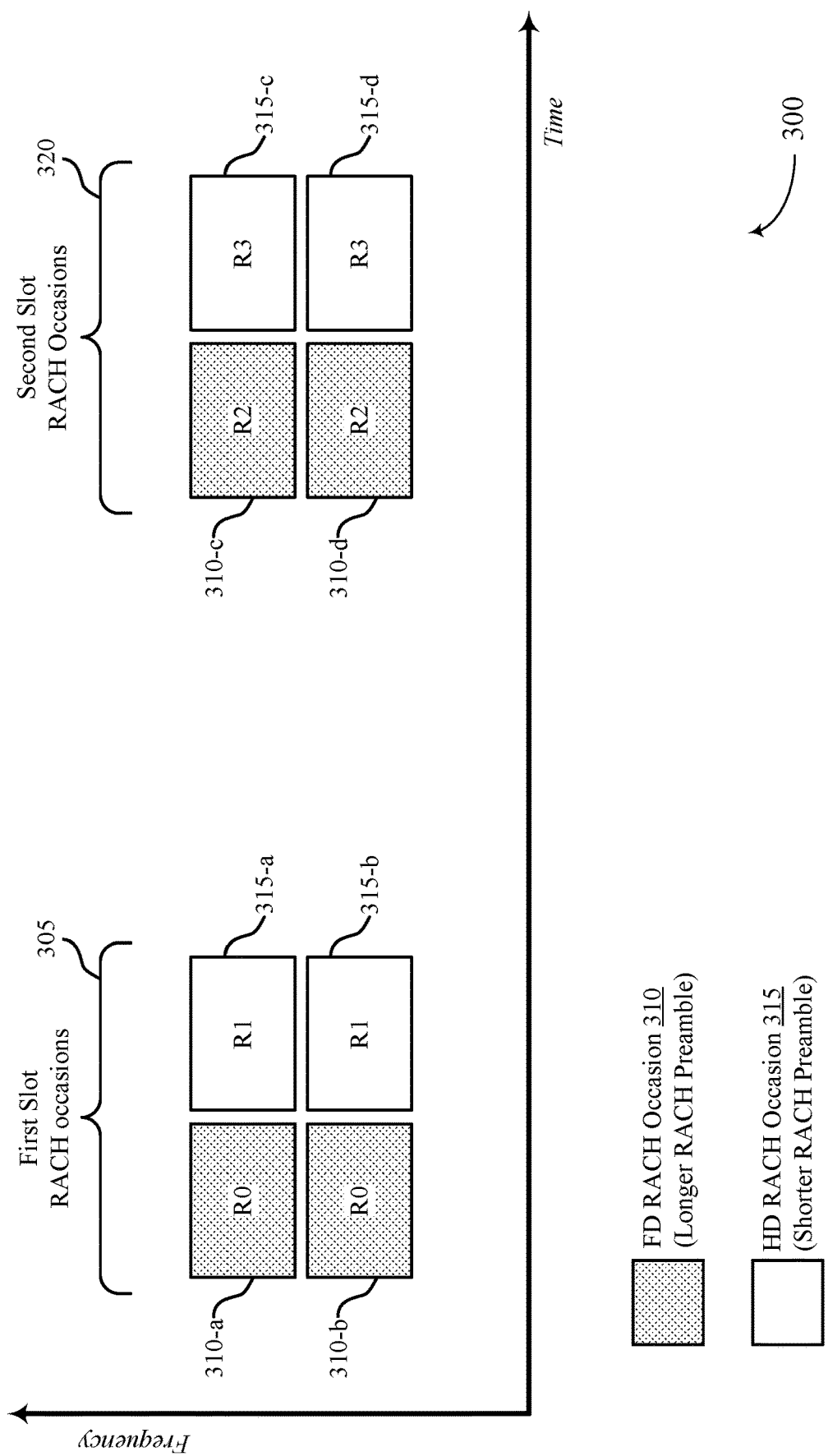
FIG. 3 illustrates an example of random access occasions that use different preamble lengths that supports random access preamble techniques in full-duplex wireless communications in accordance with one or more aspects of the present disclosure.

FIG. 3 illustrates examples of random access occasions that use different preamble lengths 300 that support random access preamble techniques in full-duplex wireless communications in accordance with one or more aspects of the present disclosure. The examples of FIG. 3 may be used for communications between a UE and a network entity, which may be examples of UEs 115 and network entities 105 as described with reference to FIGS. 1 and 2. In some examples, a network entity may transmit configuration information to a UE (e.g., in one or more MIB/SIB communications) that indicates different RACH occasions and associated preamble lengths.

In the example of FIG. 3, a first slot 305 may include RACH resources for multiple RACH occasions including full-duplex RACH occasions 310 (e.g., RACH occasions 310-a and 310-b of the first slot 305) and half-duplex RACH occasions 315 (e.g., RACH occasions 315-a and 315-b of the first slot 305). Likewise, a second slot 320 may include RACH resources for multiple RACH occasions including full-duplex RACH occasions 310 (e.g., RACH occasions 310-c and 310-d of the second slot 320) and half-duplex RACH occasions 315 (e.g., RACH occasions 315-c and 315-d of the second slot 320).

In some cases, the serving network entity may explicitly configure the different RACH occasions 310 and 315 with sets of different preamble lengths based on operating mode on these occasions (e.g., half-duplex vs. full-duplex), such as by providing indications as part of a random-access configuration (e.g., sent over SIB1). A UE operating in the cell may receive the preamble configuration and select a preamble from one or multiple sets of preambles (e.g., a first set of preambles having a longer length and a second set of preambles having a shorter length) based on the configuration of the particular random access occasion to be used by the UE. In some cases, the UE may compute a transmit power according to $\tilde{P}_t^{(j)} = PL + P_t^{(tg)} + \Delta_j$, and select a full-duplex RACH occasion 310 or half-duplex RACH occasion 315 based on the computed transmit power. For example, the network entity may operate on full-duplex RACH occasions 310 in which the UE is to use a RACH preamble with length $L_{RA\text{-}FD}$, and may operate on half-duplex RACH occasions 315 in which the UE is to use a RACH preamble with length $L_{RA}$.

Additionally, or alternatively, the selection or a RACH preamble length may be based at least in part on a full-duplex slot type. Full-Duplex slots may have a variety of formats, such as SBFD slots and IBFD slots, in which downlink and uplink overlap in the frequency domain. Further, within SBFD, multiple formats might exist that split the frequency band between downlink and uplink (e.g., the band may be split half downlink and half uplink, or 40% downlink on each side of the band and 20% uplink in the middle of the band). In such cases, each format of a full-duplex slot may have its own self-interference characteristics, and the UE may be restricted to select from a certain set of preambles depending on the slot type. For example, for higher self-interference SBFD slot format, the UE may only be configured to send a preamble that has a length greater than a given threshold. In some cases, the information for different sets of available preambles for different RACH occasions may be conveyed via MIB, SIB, or any combinations thereof.

Figure 4:
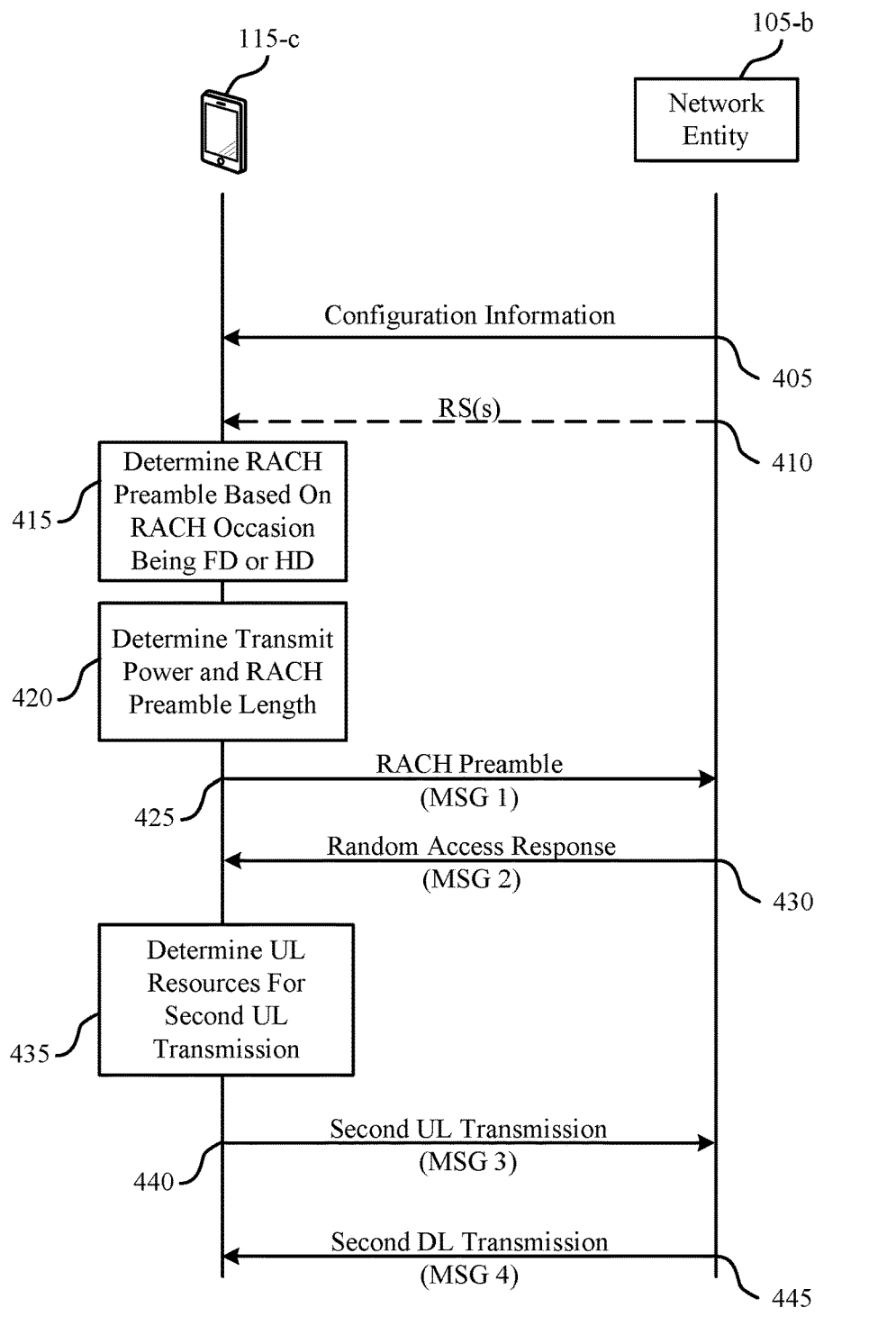
FIG. 4 illustrates an example of a process flow that supports random access preamble techniques in full-duplex wireless communications in accordance with one or more aspects of the present disclosure.

FIG. 4 illustrates an example of a process flow 400 that supports random access preamble techniques in full-duplex wireless communications in accordance with one or more aspects of the present disclosure. The process flow 400 may include various aspects of the present disclosure described with reference to FIGS. 1 through 3. For example, the process flow 400 may illustrate communications for a random access procedure between a UE 115-c and a network entity 105-b, which may be examples of corresponding devices as described with reference to FIGS. 1 through 3. In some examples, the network entity 105-b may transmit a configuration for RACH occasions and RACH preamble lengths, and the UE 115-c may transmit one or more RACH transmissions to the network entity 105-b in accordance with techniques as discussed herein. Alternative examples of the following may be implemented, where some steps are performed in a different order than described or are not performed at all. In some cases, a step may include additional features not mentioned below, or further steps may be added.

At 405, the network entity 105-b may transmit configuration information to the UE 115-c. The configuration information may include, for example, configuration for RACH occasions and RACH preamble lengths, transmit power thresholds associated with RACH preambles, full-duplex types associated with RACH preambles (e.g., as discussed with reference to FIGS. 1 through 3), or any combinations thereof. The configuration information may be provided in MIB or SIB messages, in radio resource control (RRC) signaling, or any combinations thereof, for example. In some cases, the configuration information may include a RACH target received power (e.g, $P_t^{(tg)}$). In other cases, the RACH target received power may be transmitted in one or more separate messages from the network entity 105-b.

At 410, the network entity 105-b optionally may transmit one or more reference signals. For example, the network entity 105-b may transmit one or more channel state information (CSI) reference signals, or one or more synchronization signals, that may be used at the UE 115-c to estimate a path loss of a channel between the UE 115-c and the network entity 105-b. In some cases, pathloss estimation may be based on one or more reference signals that are transmitted as part of a SIB message that contains the configuration information.

At 415, the UE 115-c may determine a RACH preamble based on a RACH occasion being a full-duplex RACH occasion or a half-duplex RACH occasion. In some cases, the configuration information may include an indication of multiple RACH occasions, where a subset of the RACH occasions are full-duplex RACH occasions and a different subset of the RACH occasions are half-duplex RACH occasions. In some cases, the configuration information may include an indication of multiple RACH occasions and RACH preambles associated with each RACH occasion, where full-duplex RACH occasions are associated with longer RACH preambles and half-duplex RACH occasions are associated with shorter RACH preambles.

At 420, the UE 115-c may determine a transmit power and RACH preamble length for a RACH transmission. The determination of transmit power and RACH preamble length may be based on various techniques as discussed herein. For example, the UE 115-c may determine the transmit power based on an open-loop power control procedure, and a maximum transmit power constraint associated with a shared radio frequency spectrum band. In some cases, the RACH preamble length may be determined based on the transmit power, where the shorter RACH preamble is selected if the transmit power is below a threshold value, and the longer RACH preamble is selected in the transmit power corresponds to a maximum allowable transmit power associated with the RACH occasion. In some cases, the RACH occasion may be determined based on a computed transmit power, and the RACH preamble selected from different subsets of RACH preambles that are associated with each RACH occasion. Additionally, or alternatively, the RACH preamble length may be determined based on a type of full-duplex (e.g., SBFD, IBFD) associated with a RACH occasion.

At 425, the UE 115-c may transmit the RACH preamble (e.g., MSG1) to the network entity 105-b. At 430, the network entity 105-b may transmit a random access response (e.g., MSG2) to the UE 115-c based on the received RACH preamble. In some cases, the UE 115-c may transmit two or more RACH preambles at different transmit powers according to an open-loop power control procedure, where a second RACH preamble with a higher transmit power than a first RACH preamble is transmitted in the event that the random access response is not received after transmission of the first RACH preamble. In some cases, the open-loop power control procedure may include a full-duplex power offset that is used to determine the uplink transmit power for a RACH preamble.

At 435, the UE 115-c may determine uplink resources for a second uplink transmission based at least in part on the random access response, in accordance with the random access procedure. At 440, the UE may transmit the second uplink transmission (e.g., MSG3) to the network entity 105-b. At 445, the random access procedure may conclude with a transmission of a second downlink transmission (e.g., MSG4) from the network entity 105-b to the UE 115-c.

Figure 5:
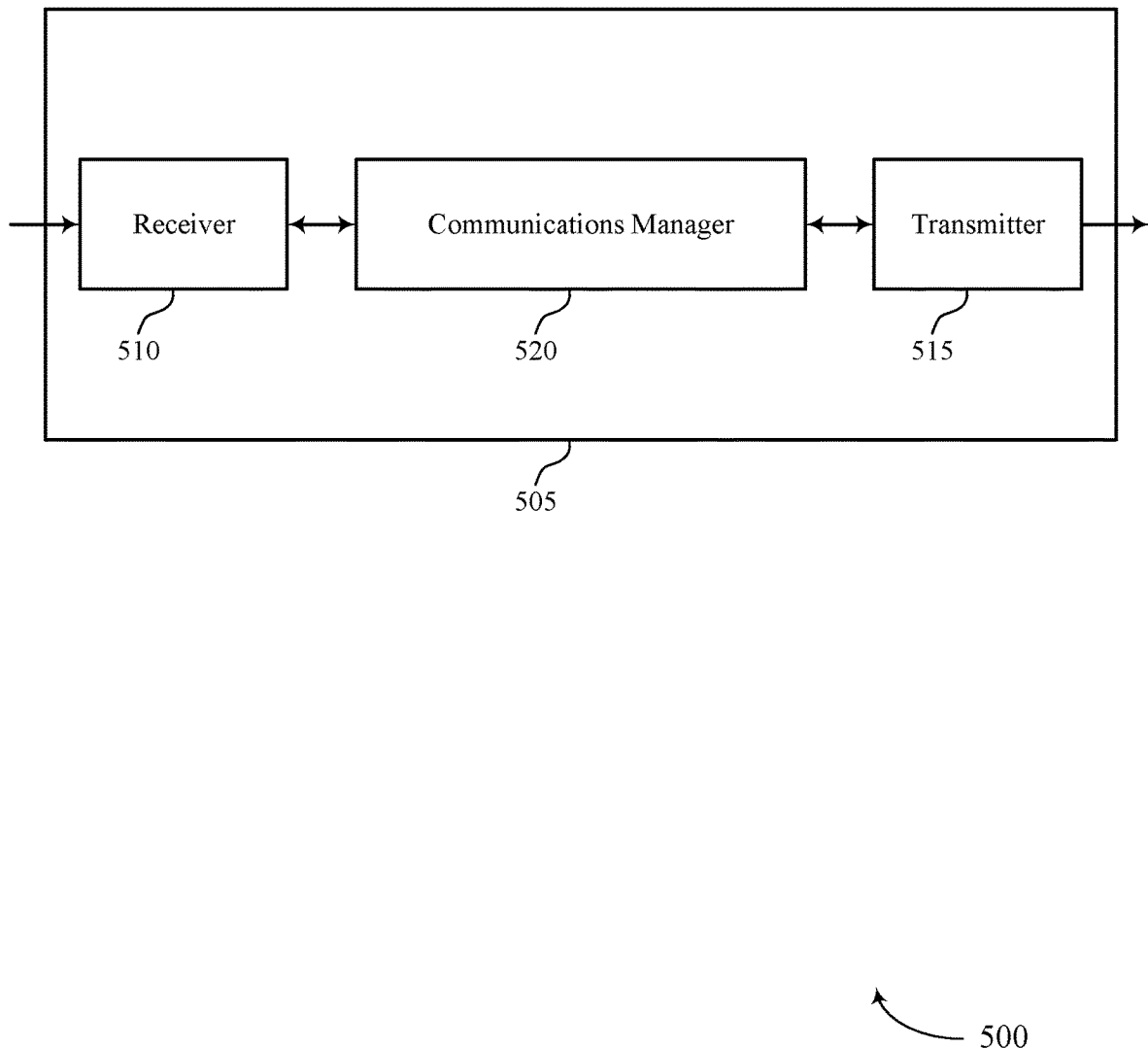
FIGS. 5 and 6 illustrate block diagrams of devices that support random access preamble techniques in full-duplex wireless communications in accordance with one or more aspects of the present disclosure.

FIG. 5 illustrates a block diagram 500 of a device 505 that supports random access preamble techniques in full-duplex wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to random access preamble techniques in full-duplex wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to random access preamble techniques in full-duplex wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of random access preamble techniques in full-duplex wireless communications as described herein.

For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources. The communications manager 520 may be configured as or otherwise support a means for transmitting, in a first random access occasion subsequent to a channel access procedure for a shared radio frequency spectrum band used for communications with the cell, a first random access request having the second random access preamble length based on the first random access occasion being associated with full-duplex communications of the cell.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for mitigation of interference related to full-duplex communications for RACH initial access procedures in shared radio frequency spectrum, which may help to enhance reliability of RACH communications in full-duplex communications (e.g., to mitigate self-interference in full-duplex slots). Such techniques thus enhance network efficiency through reduced overhead, enhance reliability and throughput through mitigation of interference in RACH communications, provide for reduced power consumption through fewer retransmissions, and provide for enhanced user experience.

Figure 6:
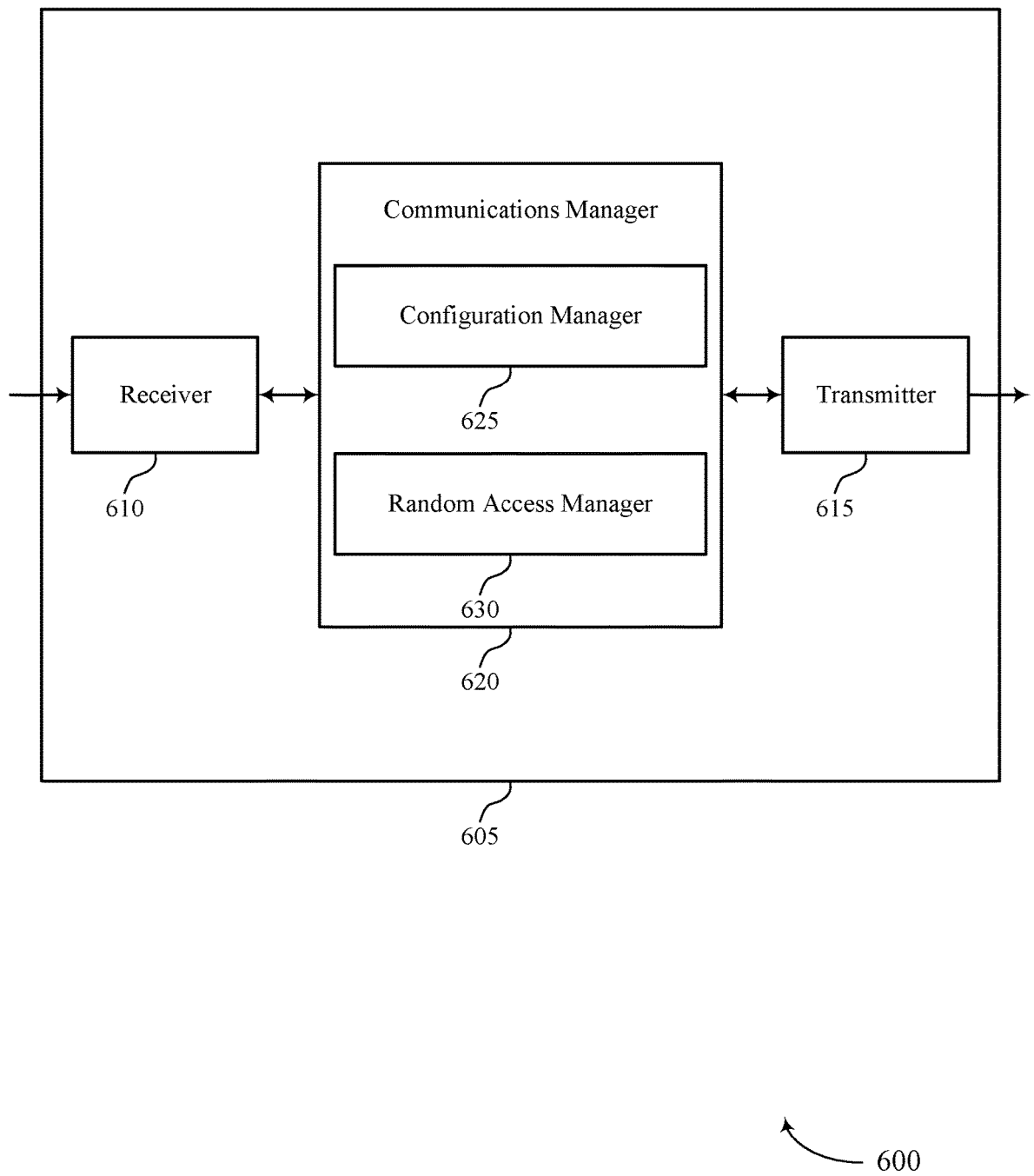

FIG. 6 illustrates a block diagram 600 of a device 605 that supports random access preamble techniques in full-duplex wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to random access preamble techniques in full-duplex wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to random access preamble techniques in full-duplex wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of random access preamble techniques in full-duplex wireless communications as described herein. For example, the communications manager 620 may include a configuration manager 625 a random access manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The configuration manager 625 may be configured as or otherwise support a means for receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources. The random access manager 630 may be configured as or otherwise support a means for transmitting, in a first random access occasion subsequent to a channel access procedure for a shared radio frequency spectrum band used for communications with the cell, a first random access request having the second random access preamble length based on the first random access occasion being associated with full-duplex communications of the cell.

Figure 7:
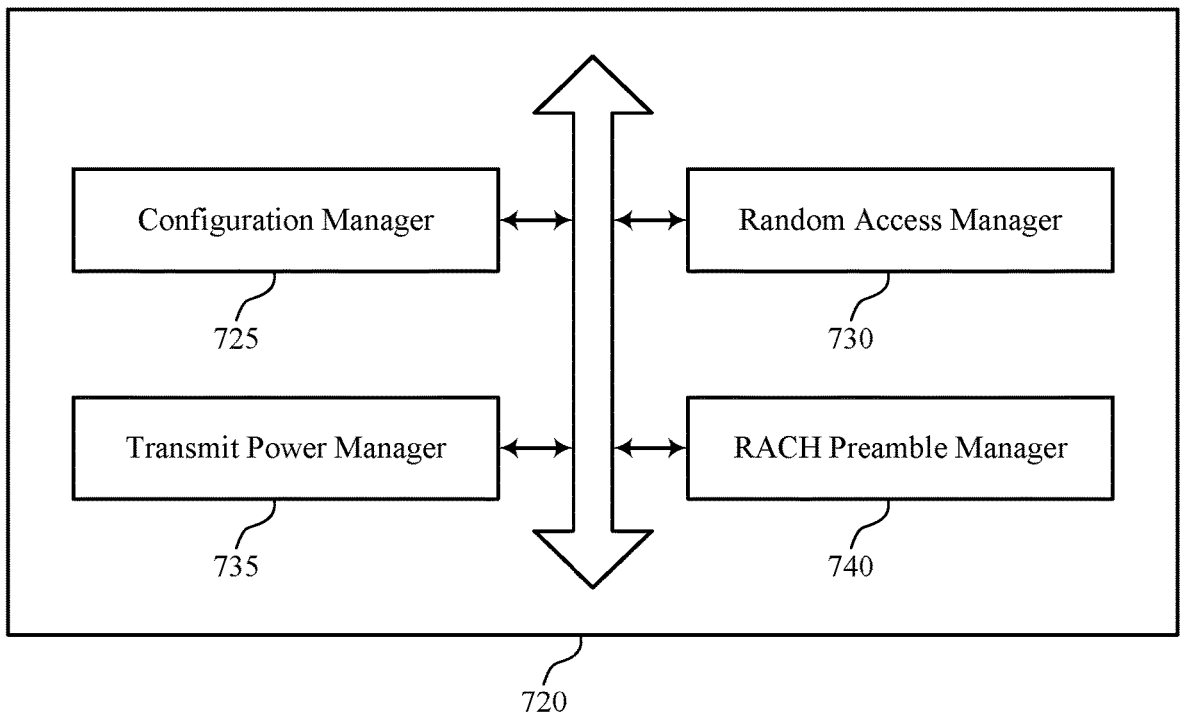
FIG. 7 illustrates a block diagram of a communications manager that supports random access preamble techniques in full-duplex wireless communications in accordance with one or more aspects of the present disclosure.

FIG. 7 illustrates a block diagram 700 of a communications manager 720 that supports random access preamble techniques in full-duplex wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of random access preamble techniques in full-duplex wireless communications as described herein. For example, the communications manager 720 may include a configuration manager 725, a random access manager 730, a transmit power manager 735, a RACH preamble manager 740, or any combination thereof. Each of these components may communicate, directly or indirectly, with one another (e.g., via one or more buses).

The communications manager 720 may support wireless communication at a UE in accordance with examples as disclosed herein. The configuration manager 725 may be configured as or otherwise support a means for receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources. The random access manager 730 may be configured as or otherwise support a means for transmitting, in a first random access occasion subsequent to a channel access procedure for a shared radio frequency spectrum band used for communications with the cell, a first random access request having the second random access preamble length based on the first random access occasion being associated with full-duplex communications of the cell.

In some examples, the transmit power manager 735 may be configured as or otherwise support a means for determining a random access transmit power for the first random access request based on a full-duplex power offset associated with the first random access occasion, and where the first random access request is transmitted using the random access transmit power. In some examples, the full-duplex power offset mitigates self-interference associated with the full-duplex communications of the cell. In some examples, the full-duplex power offset is received with the configuration information in a master information block message, in a system information block message, or any combinations thereof.

In some examples, the transmit power manager 735 may be configured as or otherwise support a means for determining a random access transmit power for the first random access request based on an open-loop power control procedure for random access transmissions. In some examples, the RACH preamble manager 740 may be configured as or otherwise support a means for selecting the second random access preamble length for the first random access request based on the random access transmit power being at or above a threshold value, where the first random access preamble length is selected for one or more random access requests based on the random access transmit power being below the threshold value. In some examples, the threshold value for the random access transmit power is based on a regulatory maximum transmit power for communications in a shared or unlicensed radio frequency spectrum band.

In some examples, the configuration information includes an indication of a first subset of random access occasions associated with the first random access preamble length and a second subset of random access occasions associated with the second random access preamble length, and where the second random access preamble length is selected for the first random access request based on the first random access occasion being included in the second subset of random access occasions. In some examples, the first random access preamble length and the second random access preamble length are provided with the configuration information in a master information block message, in a system information block message, or any combinations thereof.

In some examples, the transmit power manager 735 may be configured as or otherwise support a means for determining a transmit power for the first random access request based on the first random access occasion being included in the second subset of random access occasions, where the first subset of random access occasions are configured with a different transmit power than the second subset of random access occasions. In some examples, the configuration information includes information for two or more random access occasions having different random access preamble lengths within a same slot, a same set of frequency resources, or both.

In some examples, the configuration information includes a first set of random access preambles associated with a first subband full-duplex (SBFD) slot format and a second set of random access preambles associated with a second SBFD slot format, and where a first random access preamble is selected for the first random access request based at least on part on whether a slot associated with the first random access occasion is associated with the first SBFD format or the second SBFD format. In some examples, the first set of random access preambles have a different preamble length than the second set of random access preambles.

Figure 8:
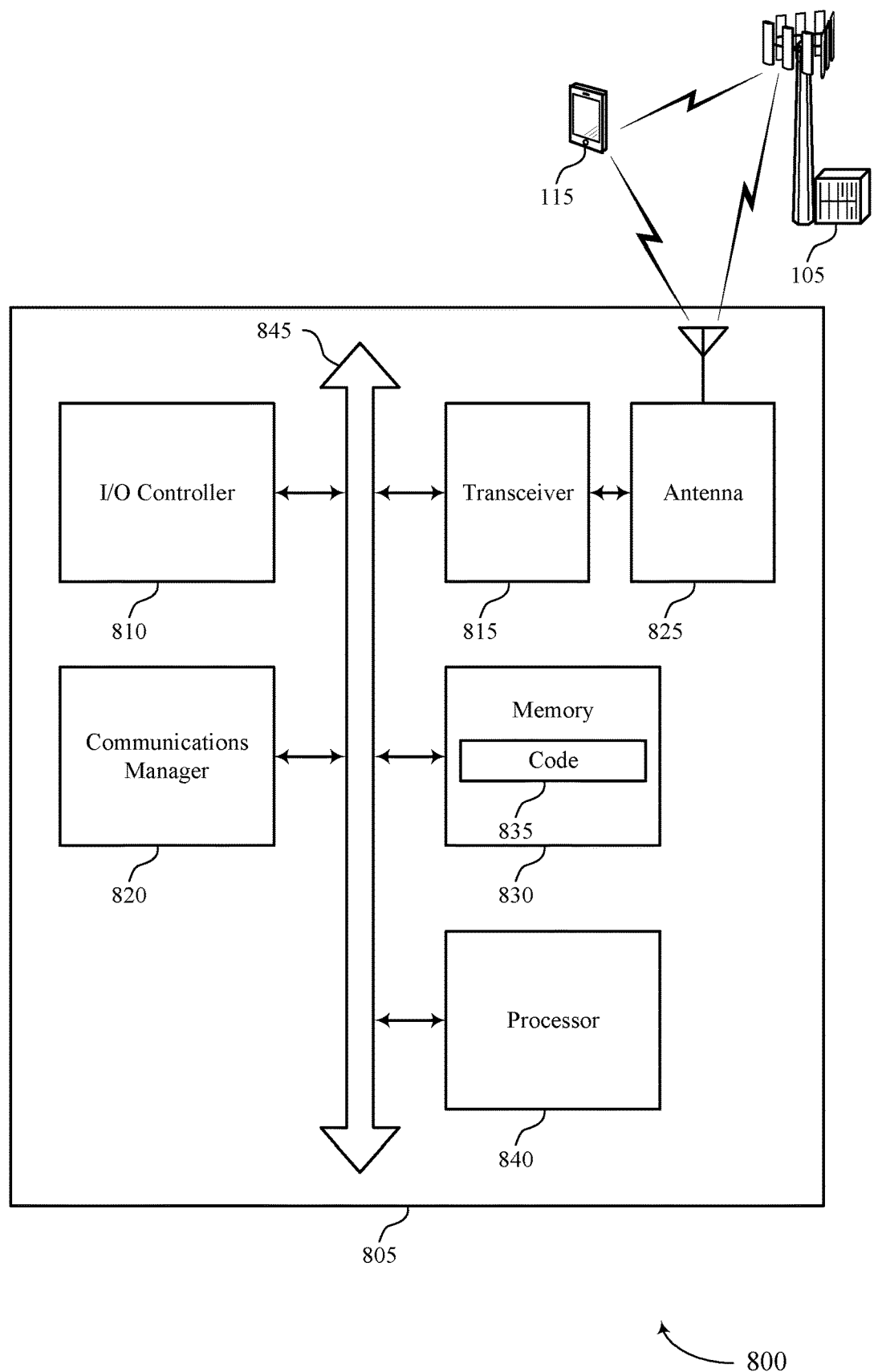
FIG. 8 illustrates a diagram of a system including a device that supports random access preamble techniques in full-duplex wireless communications in accordance with one or more aspects of the present disclosure.

FIG. 8 illustrates a diagram of a system 800 including a device 805 that supports random access preamble techniques in full-duplex wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting random access preamble techniques in full-duplex wireless communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources. The communications manager 820 may be configured as or otherwise support a means for transmitting, in a first random access occasion subsequent to a channel access procedure for a shared radio frequency spectrum band used for communications with the cell, a first random access request having the second random access preamble length based on the first random access occasion being associated with full-duplex communications of the cell.

By including or configuring the communications manager 820 in accordance with examples as described herein, the device 805 may support techniques for mitigation of interference related to full-duplex communications for RACH initial access procedures in shared radio frequency spectrum, which may help to enhance reliability of RACH communications in full-duplex communications (e.g., to mitigate self-interference in full-duplex slots). Such techniques thus enhance network efficiency through reduced overhead, enhance reliability and throughput through mitigation of interference in RACH communications, provide for reduced power consumption through fewer retransmissions, and provide for enhanced user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of random access preamble techniques in full-duplex wireless communications as described herein, or the processor 840 and the memory 830 may be otherwise configured to perform or support such operations.

Figure 9:
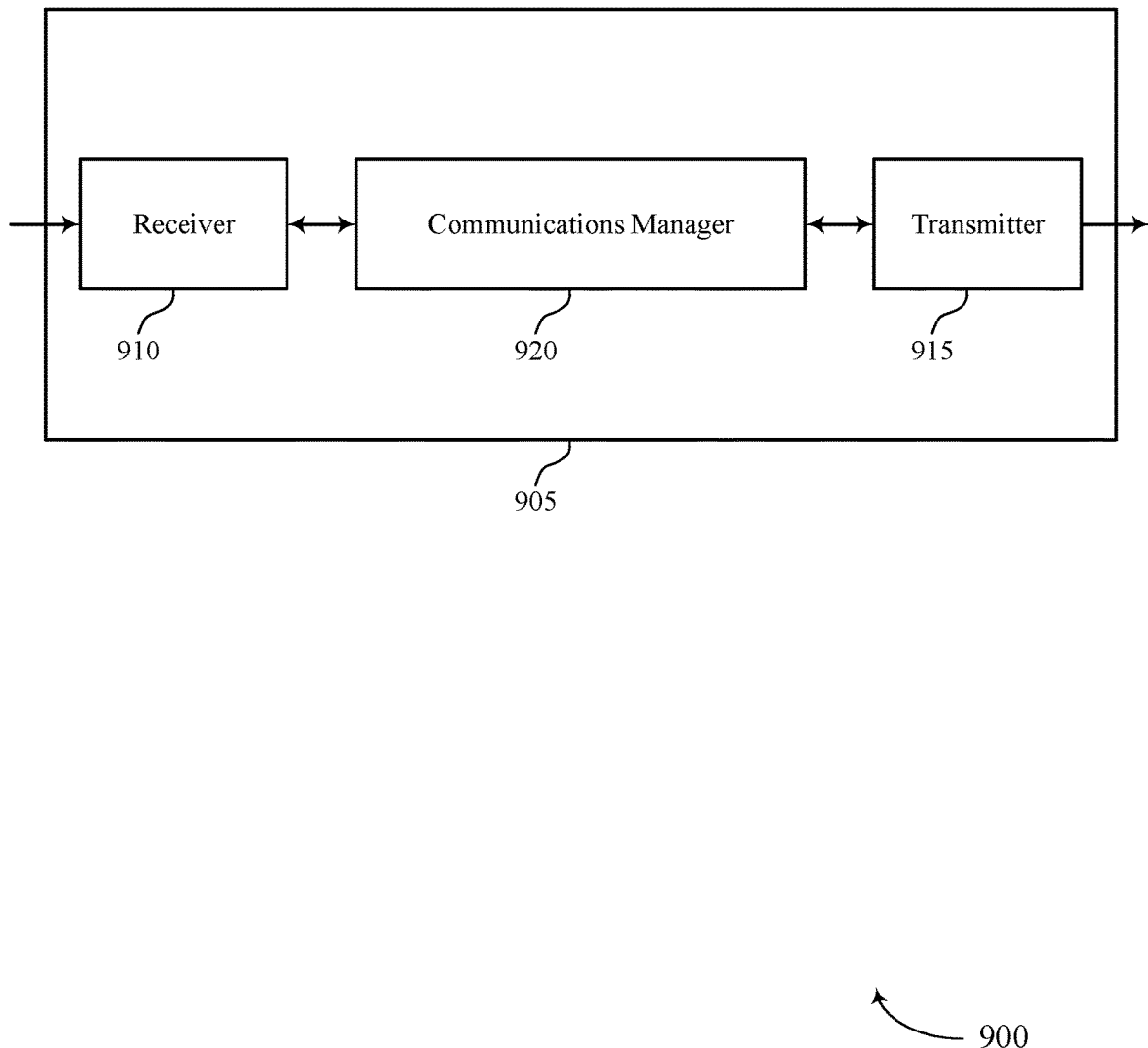
FIGS. 9 and 10 illustrate block diagrams of devices that support random access preamble techniques in full-duplex wireless communications in accordance with one or more aspects of the present disclosure.

FIG. 9 illustrates a block diagram 900 of a device 905 that supports random access preamble techniques in full-duplex wireless communications in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., UQ samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., UQ samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of random access preamble techniques in full-duplex wireless communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources. The communications manager 920 may be configured as or otherwise support a means for receiving, from the UE in a first random access occasion subsequent to a channel access procedure for a shared radio frequency spectrum band used for communications with the UE, a first random access request having the second random access preamble length based on the first random access occasion being associated with full-duplex communications of the cell.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for mitigation of interference related to full-duplex communications for RACH initial access procedures in shared radio frequency spectrum, which may help to enhance reliability of RACH communications in full-duplex communications (e.g., to mitigate self-interference in full-duplex slots). Such techniques thus enhance network efficiency through reduced overhead, enhance reliability and throughput through mitigation of interference in RACH communications, provide for reduced power consumption through fewer retransmissions, and provide for enhanced user experience.

Figure 10:
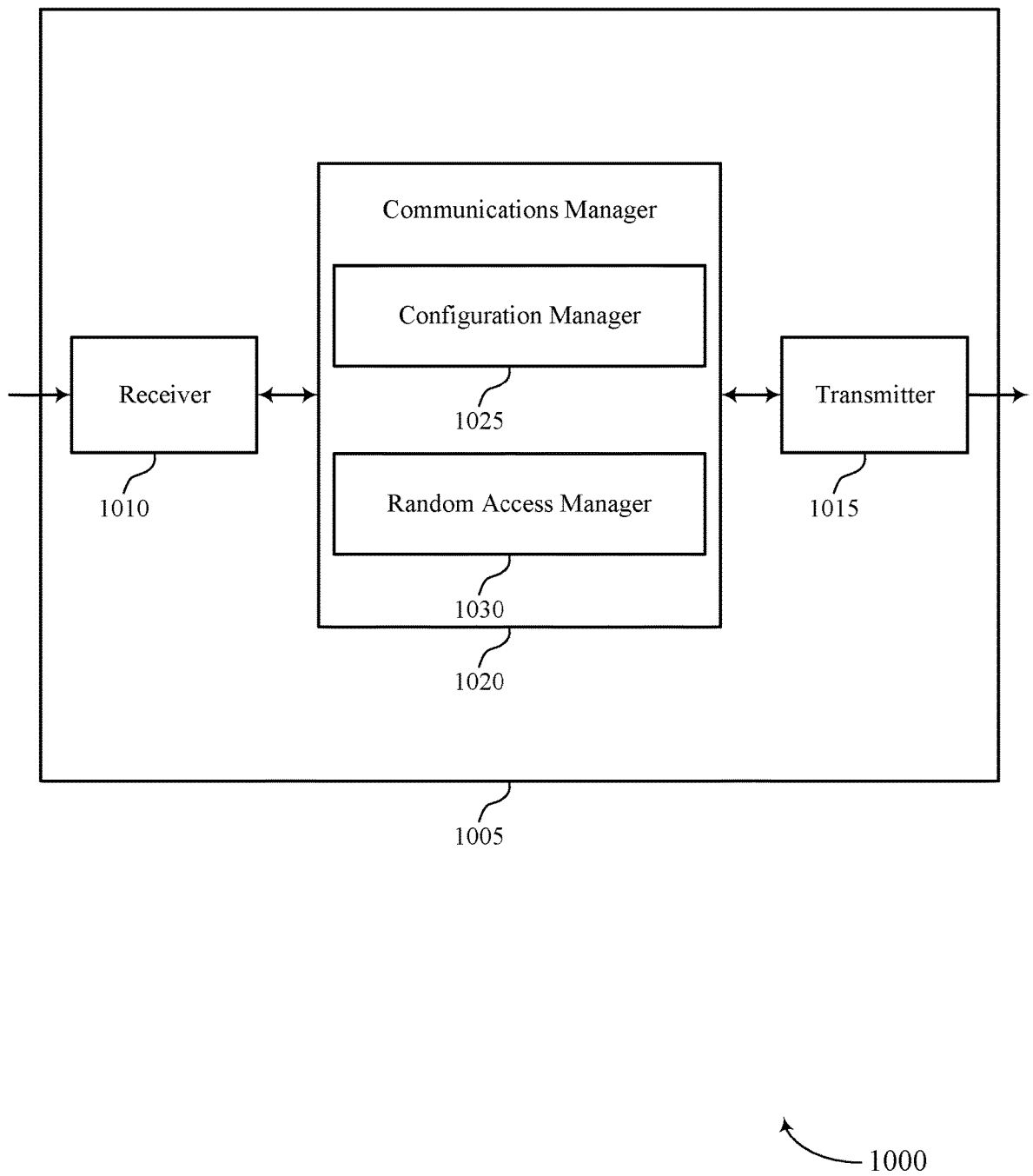

FIG. 10 illustrates a block diagram 1000 of a device 1005 that supports random access preamble techniques in full-duplex wireless communications in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., UQ samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of random access preamble techniques in full-duplex wireless communications as described herein. For example, the communications manager 1020 may include a configuration manager 1025 a random access manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration manager 1025 may be configured as or otherwise support a means for transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources. The random access manager 1030 may be configured as or otherwise support a means for receiving, from the UE in a first random access occasion subsequent to a channel access procedure for a shared radio frequency spectrum band used for communications with the UE, a first random access request having the second random access preamble length based on the first random access occasion being associated with full-duplex communications of the cell.

Figure 11:
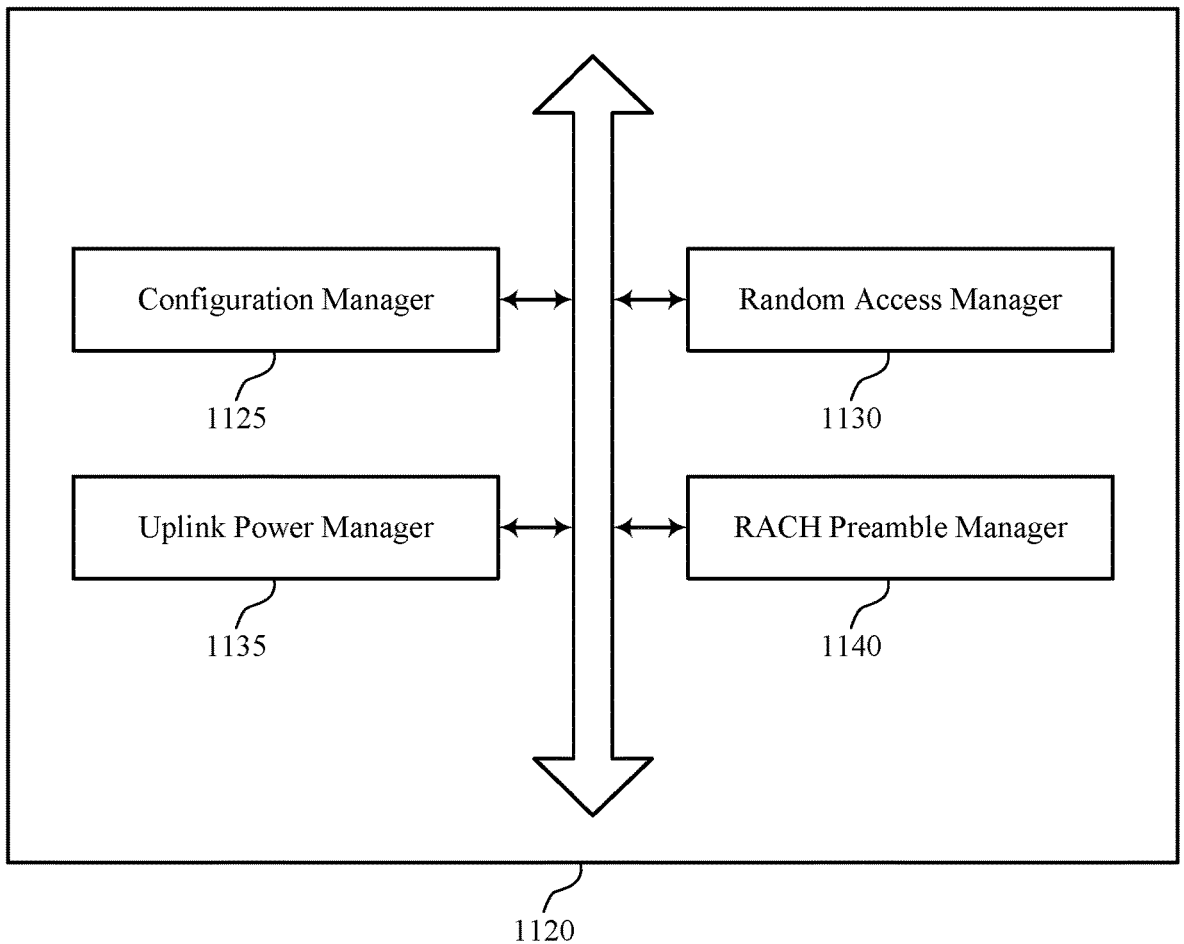
FIG. 11 illustrates a block diagram of a communications manager that supports random access preamble techniques in full-duplex wireless communications in accordance with one or more aspects of the present disclosure.

FIG. 11 illustrates a block diagram 1100 of a communications manager 1120 that supports random access preamble techniques in full-duplex wireless communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of random access preamble techniques in full-duplex wireless communications as described herein. For example, the communications manager 1120 may include a configuration manager 1125, a random access manager 1130, an uplink power manager 1135, a RACH preamble manager 1140, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration manager 1125 may be configured as or otherwise support a means for transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources. The random access manager 1130 may be configured as or otherwise support a means for receiving, from the UE in a first random access occasion subsequent to a channel access procedure for a shared radio frequency spectrum band used for communications with the UE, a first random access request having the second random access preamble length based on the first random access occasion being associated with full-duplex communications of the cell.

In some examples, the configuration information indicates a random access transmit power for the first random access request that is based on a full-duplex power offset associated with the first random access occasion. In some examples, the full-duplex power offset mitigates self-interference associated with the full-duplex communications of the cell. In some examples, the full-duplex power offset is transmitted with the configuration information in a master information block message, in a system information block message, or any combinations thereof.

In some examples, the configuration information indicates a random access configuration having an open-loop power control procedure that provides a random access transmit power for the first random access request, and where the first random access preamble length is used for random access requests when the random access transmit power is below a threshold value, and the second random access preamble length is used for random access requests when the random access transmit power is at or above the threshold value. In some examples, the threshold value for the random access transmit power is based on a regulatory maximum transmit power for communications in a shared or unlicensed radio frequency spectrum band.

In some examples, the configuration information includes an indication of a first subset of random access occasions associated with the first random access preamble length and a second subset of random access occasions associated with the second random access preamble length, and where the second random access preamble length is selected for the first random access request based on the first random access occasion being included in the second subset of random access occasions. In some examples, the first random access preamble length and the second random access preamble length are provided with the configuration information in a master information block message, in a system information block message, or any combinations thereof. In some examples, the configuration information indicates a transmit power for the first random access request based on the first random access occasion being included in the second subset of random access occasions, where the first subset of random access occasions are configured with a different transmit power than the second subset of random access occasions. In some examples, the configuration information includes information for two or more random access occasions having different random access preamble lengths within a same slot, a same set of frequency resources, or both.

In some examples, the configuration information includes a first set of random access preambles associated with a first subband full-duplex (SBFD) slot format and a second set of random access preambles associated with a second SBFD slot format, and where a random access preamble is selected for a random access request based at least on part on whether a slot for transmission of the random access request is associated with the first SBFD format or the second SBFD format. In some examples, the first set of random access preambles have a different preamble length than the second set of random access preambles.

Figure 12:
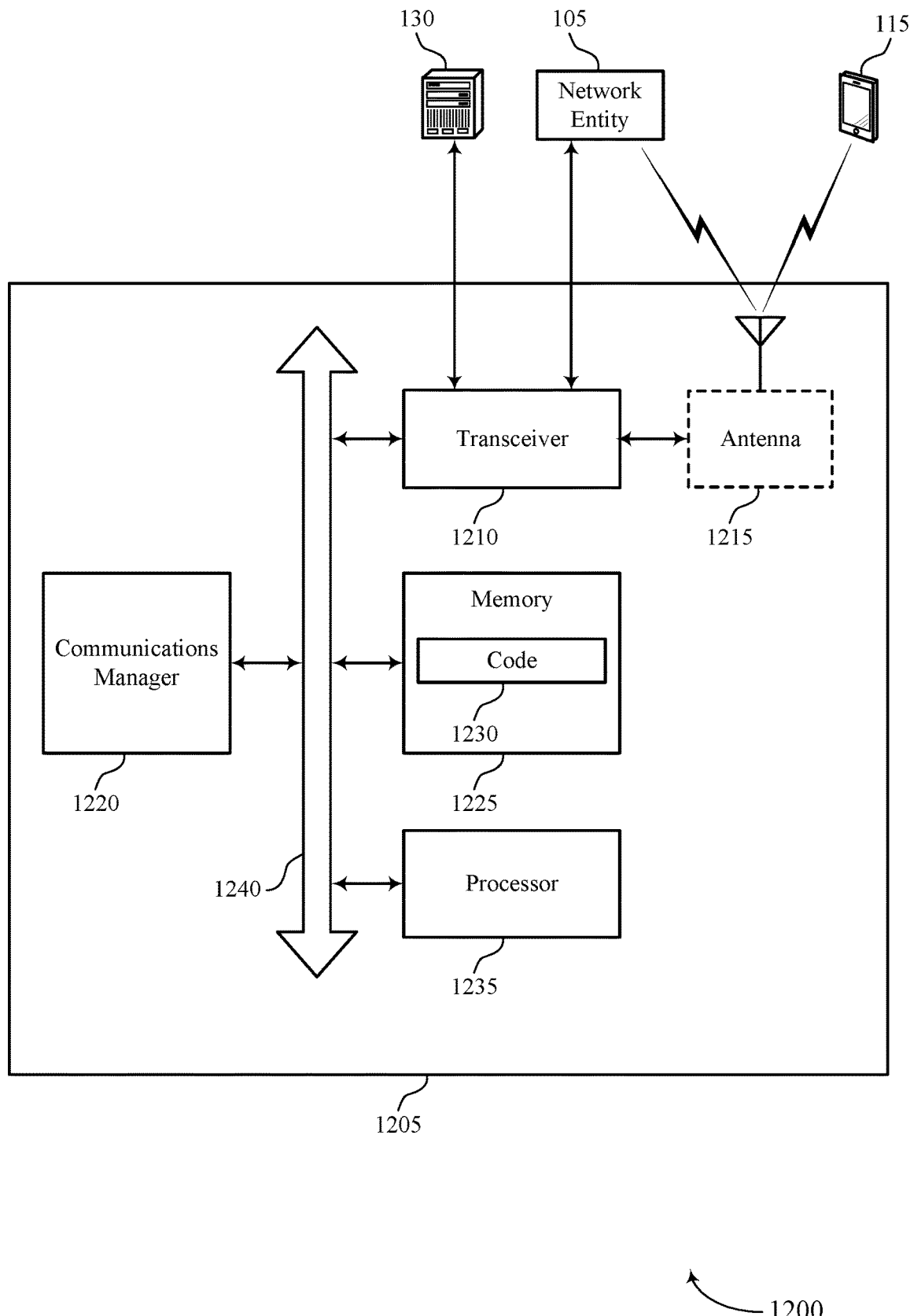
FIG. 12 illustrates a diagram of a system including a device that supports random access preamble techniques in full-duplex wireless communications in accordance with one or more aspects of the present disclosure.

FIG. 12 illustrates a diagram of a system 1200 including a device 1205 that supports random access preamble techniques in full-duplex wireless communications in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting random access preamble techniques in full-duplex wireless communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources. The communications manager 1220 may be configured as or otherwise support a means for receiving, from the UE in a first random access occasion subsequent to a channel access procedure for a shared radio frequency spectrum band used for communications with the UE, a first random access request having the second random access preamble length based on the first random access occasion being associated with full-duplex communications of the cell.

By including or configuring the communications manager 1220 in accordance with examples as described herein, the device 1205 may support techniques for mitigation of interference related to full-duplex communications for RACH initial access procedures in shared radio frequency spectrum, which may help to enhance reliability of RACH communications in full-duplex communications (e.g., to mitigate self-interference in full-duplex slots). Such techniques thus enhance network efficiency through reduced overhead, enhance reliability and throughput through mitigation of interference in RACH communications, provide for reduced power consumption through fewer retransmissions, and provide for enhanced user experience.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of random access preamble techniques in full-duplex wireless communications as described herein, or the processor 1235 and the memory 1225 may be otherwise configured to perform or support such operations.

Figure 13:
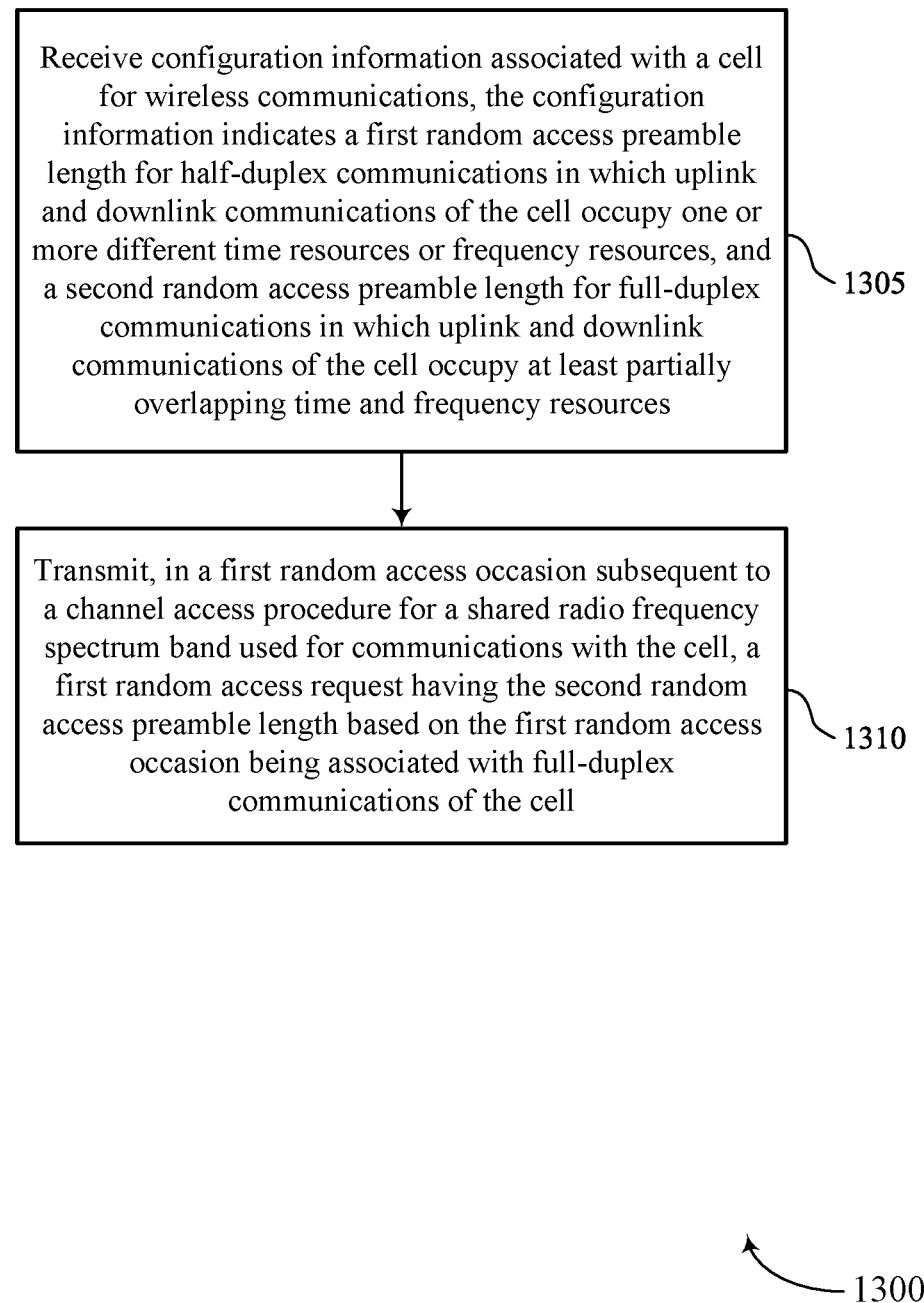
FIGS. 13 through 16 illustrate flowcharts showing methods that support random access preamble techniques in full-duplex wireless communications in accordance with one or more aspects of the present disclosure.

FIG. 13 illustrates a flowchart illustrating a method 1300 that supports random access preamble techniques in full-duplex wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources. The operations of 1305 may be performed in accordance with examples as disclosed herein. In some examples, aspects of the operations of 1305 may be performed by a configuration manager 725 as described with reference to FIG. 7.

At 1310, the method may include transmitting, in a first random access occasion subsequent to a channel access procedure for a shared radio frequency spectrum band used for communications with the cell, a first random access request having the second random access preamble length based on the first random access occasion being associated with full-duplex communications of the cell. The operations of 1310 may be performed in accordance with examples as disclosed herein. In some examples, aspects of the operations of 1310 may be performed by a random access manager 730 as described with reference to FIG. 7.

Figure 14:
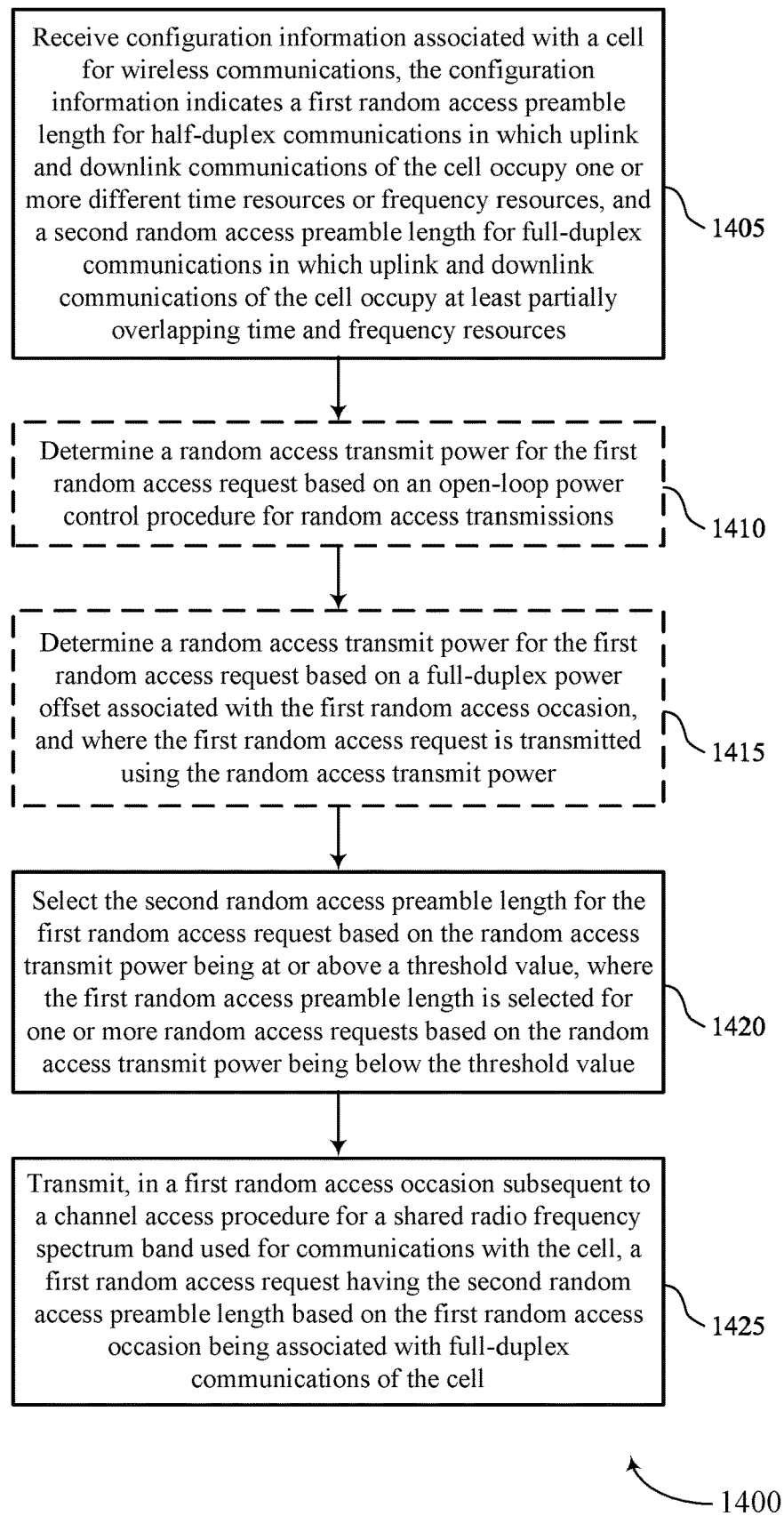

FIG. 14 illustrates a flowchart illustrating a method 1400 that supports random access preamble techniques in full-duplex wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources. The operations of 1405 may be performed in accordance with examples as disclosed herein. In some examples, aspects of the operations of 1405 may be performed by a configuration manager 725 as described with reference to FIG. 7.

Optionally, at 1410, the method may include determining a random access transmit power for the first random access request based on an open-loop power control procedure for random access transmissions. The operations of 1410 may be performed in accordance with examples as disclosed herein. In some examples, aspects of the operations of 1410 may be performed by a transmit power manager 735 as described with reference to FIG. 7.

Optionally, at 1415, the method may include determining a random access transmit power for the first random access request based on a full-duplex power offset associated with the first random access occasion, and where the first random access request is transmitted using the random access transmit power. The operations of 1415 may be performed in accordance with examples as disclosed herein. In some examples, aspects of the operations of 1415 may be performed by a transmit power manager 735 as described with reference to FIG. 7.

At 1420, the method may include selecting the second random access preamble length for the first random access request based on the random access transmit power being at or above a threshold value, where the first random access preamble length is selected for one or more random access requests based on the random access transmit power being below the threshold value. The operations of 1420 may be performed in accordance with examples as disclosed herein. In some examples, aspects of the operations of 1420 may be performed by a RACH preamble manager 740 as described with reference to FIG. 7.

At 1425, the method may include transmitting, in a first random access occasion subsequent to a channel access procedure for a shared radio frequency spectrum band used for communications with the cell, a first random access request having the second random access preamble length based on the first random access occasion being associated with full-duplex communications of the cell. The operations of 1425 may be performed in accordance with examples as disclosed herein. In some examples, aspects of the operations of 1425 may be performed by a random access manager 730 as described with reference to FIG. 7.

Figure 15:
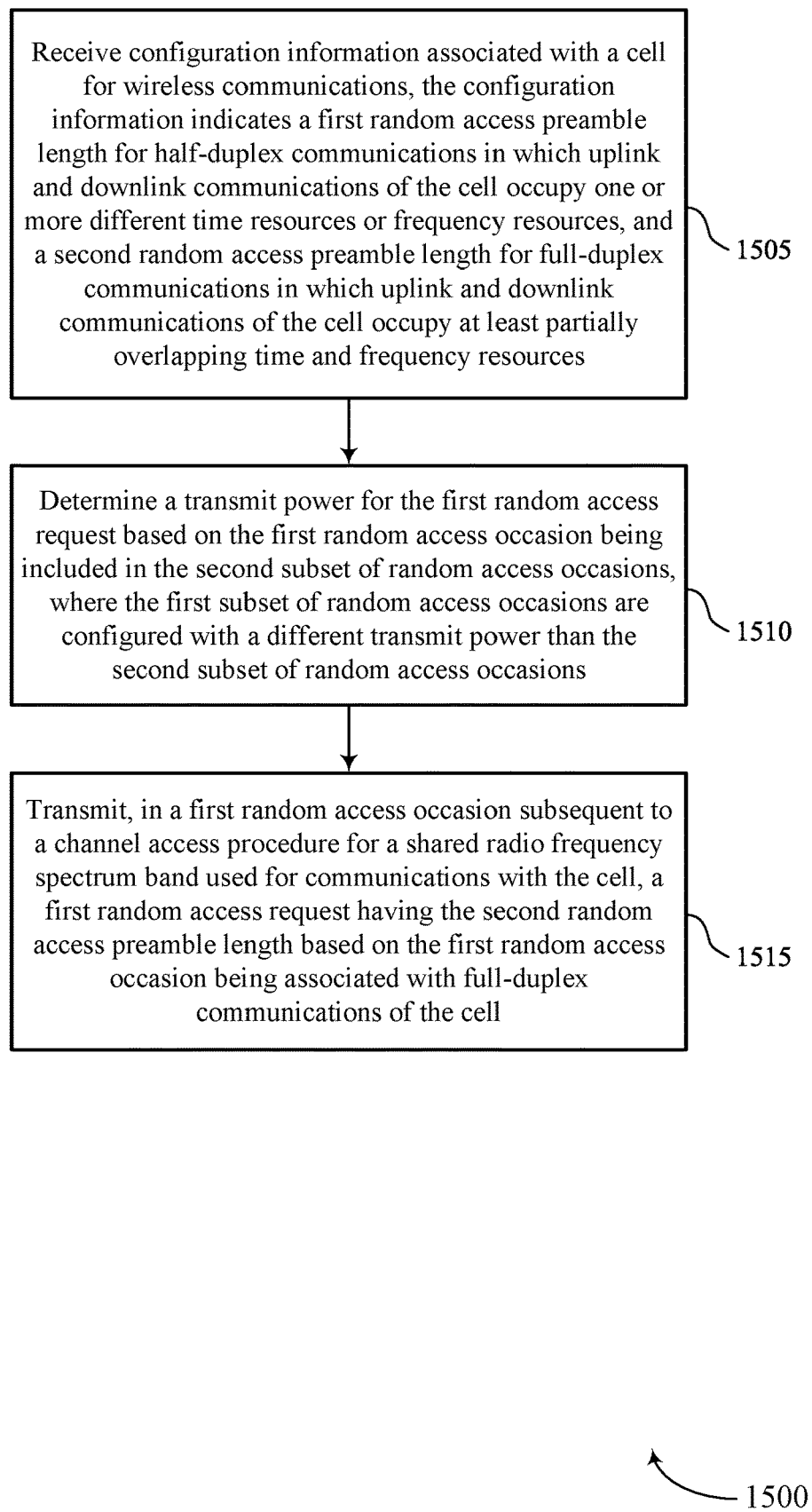

FIG. 15 illustrates a flowchart illustrating a method 1500 that supports random access preamble techniques in full-duplex wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources. The operations of 1505 may be performed in accordance with examples as disclosed herein. In some examples, aspects of the operations of 1505 may be performed by a configuration manager 725 as described with reference to FIG. 7. In some cases, the configuration information may include an indication of a first subset of random access occasions associated with the first random access preamble length and a second subset of random access occasions associated with the second random access preamble length, and where the second random access preamble length is selected for the first random access request based on the first random access occasion being included in the second subset of random access occasions.

At 1510, the method may include determining a transmit power for the first random access request based on the first random access occasion being included in the second subset of random access occasions, where the first subset of random access occasions are configured with a different transmit power than the second subset of random access occasions. The operations of 1510 may be performed in accordance with examples as disclosed herein. In some examples, aspects of the operations of 1510 may be performed by a transmit power manager 735 as described with reference to FIG. 7.

At 1515, the method may include transmitting, in a first random access occasion subsequent to a channel access procedure for a shared radio frequency spectrum band used for communications with the cell, a first random access request having the second random access preamble length based on the first random access occasion being associated with full-duplex communications of the cell. The operations of 1515 may be performed in accordance with examples as disclosed herein. In some examples, aspects of the operations of 1515 may be performed by a random access manager 730 as described with reference to FIG. 7.

Figure 16:
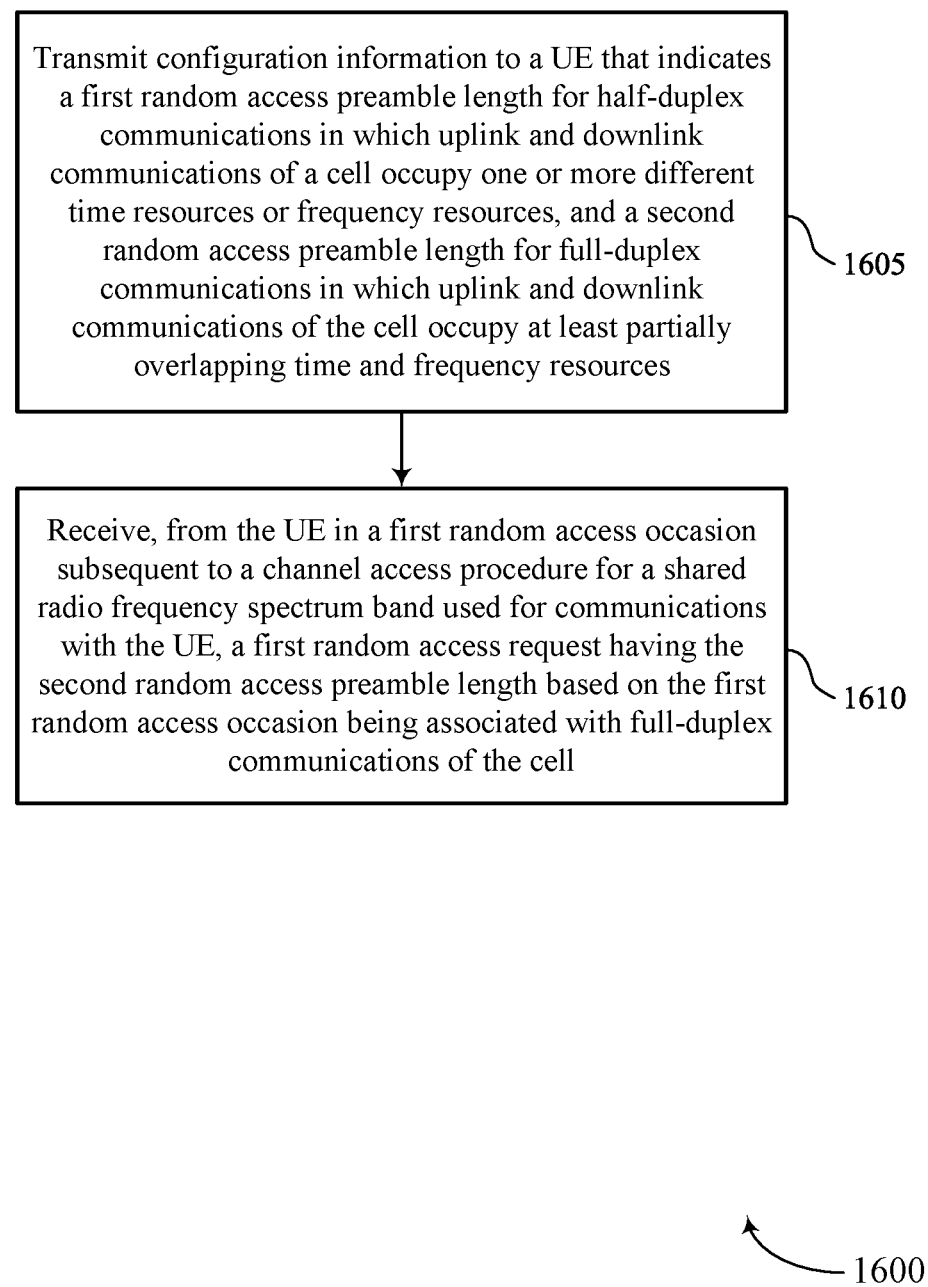

FIG. 16 illustrates a flowchart illustrating a method 1600 that supports random access preamble techniques in full-duplex wireless communications in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources. The operations of 1605 may be performed in accordance with examples as disclosed herein. In some examples, aspects of the operations of 1605 may be performed by a configuration manager 1125 as described with reference to FIG. 11.

At 1610, the method may include receiving, from the UE in a first random access occasion subsequent to a channel access procedure for a shared radio frequency spectrum band used for communications with the UE, a first random access request having the second random access preamble length based on the first random access occasion being associated with full-duplex communications of the cell. The operations of 1610 may be performed in accordance with examples as disclosed herein. In some examples, aspects of the operations of 1610 may be performed by a random access manager 1130 as described with reference to FIG. 11.

The following provides an overview of aspects of the present disclosure:

Aspect 1: A method for wireless communication at a UE, comprising: receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources; and transmitting, in a first random access occasion subsequent to a channel access procedure for a shared radio frequency spectrum band used for communications with the cell, a first random access request having the second random access preamble length based at least in part on the first random access occasion being associated with full-duplex communications of the cell.

Aspect 2: The method of aspect 1, further comprising: determining a random access transmit power for the first random access request based at least in part on a full-duplex power offset associated with the first random access occasion, and wherein the first random access request is transmitted using the random access transmit power.

Aspect 3: The method of aspect 2, wherein the full-duplex power offset mitigates self-interference associated with the full-duplex communications of the cell.

Aspect 4: The method of any of aspects 2 through 3, wherein the full-duplex power offset is received with the configuration information in a master information block message, in a system information block message, or any combinations thereof.

Aspect 5: The method of aspect 1, further comprising: determining a random access transmit power for the first random access request based at least in part on an open-loop power control procedure for random access transmissions; and selecting the second random access preamble length for the first random access request based at least in part on the random access transmit power being at or above a threshold value, wherein the first random access preamble length is selected for one or more random access requests based at least in part on the random access transmit power being below the threshold value.

Aspect 6: The method of aspect 5, wherein the threshold value for the random access transmit power is based at least in part on a regulatory maximum transmit power for communications in a shared or unlicensed radio frequency spectrum band.

Aspect 7: The method of aspect 1, wherein the configuration information includes an indication of a first subset of random access occasions associated with the first random access preamble length and a second subset of random access occasions associated with the second random access preamble length, and wherein the second random access preamble length is selected for the first random access request based at least in part on the first random access occasion being included in the second subset of random access occasions.

Aspect 8: The method of aspect 7, wherein the first random access preamble length and the second random access preamble length are provided with the configuration information in a master information block message, in a system information block message, or any combinations thereof.

Aspect 9: The method of any of aspects 7 through 8, further comprising: determining a transmit power for the first random access request based at least in part on the first random access occasion being included in the second subset of random access occasions, wherein the first subset of random access occasions are configured with a different transmit power than the second subset of random access occasions.

Aspect 10: The method of any of aspects 1 through 9, wherein the configuration information includes information for two or more random access occasions having different random access preamble lengths within a same slot, a same set of frequency resources, or both.

Aspect 11: The method of aspect 1, wherein the configuration information includes a first set of random access preambles associated with a first SBFD slot format and a second set of random access preambles associated with a second SBFD slot format, and wherein a first random access preamble is selected for the first random access request based at least on part on whether a slot associated with the first random access occasion is associated with the first SBFD format or the second SBFD format.

Aspect 12: The method of aspect 11, wherein the first set of random access preambles have a different preamble length than the second set of random access preambles.

Aspect 13: A method for wireless communication at a network entity, comprising: transmitting configuration information to a UE that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources; and receiving, from the UE in a first random access occasion subsequent to a channel access procedure for a shared radio frequency spectrum band used for communications with the UE, a first random access request having the second random access preamble length based at least in part on the first random access occasion being associated with full-duplex communications of the cell.

Aspect 14: The method of aspect 13, wherein the configuration information indicates a random access transmit power for the first random access request that is based at least in part on a full-duplex power offset associated with the first random access occasion.

Aspect 15: The method of aspect 14, wherein the full-duplex power offset mitigates self-interference associated with the full-duplex communications of the cell.

Aspect 16: The method of any of aspects 14 through 15, wherein the full-duplex power offset is transmitted with the configuration information in a master information block message, in a system information block message, or any combinations thereof.

Aspect 17: The method of aspect 13, wherein the configuration information indicates a random access configuration having an open-loop power control procedure that provides a random access transmit power for the first random access request, and wherein the first random access preamble length is used for random access requests when the random access transmit power is below a threshold value, and the second random access preamble length is used for random access requests when the random access transmit power is at or above the threshold value.

Aspect 18: The method of aspect 17, wherein the threshold value for the random access transmit power is based at least in part on a regulatory maximum transmit power for communications in a shared or unlicensed radio frequency spectrum band.

Aspect 19: The method of aspect 13, wherein the configuration information includes an indication of a first subset of random access occasions associated with the first random access preamble length and a second subset of random access occasions associated with the second random access preamble length, and wherein the second random access preamble length is selected for the first random access request based at least in part on the first random access occasion being included in the second subset of random access occasions.

Aspect 20: The method of aspect 19, wherein the first random access preamble length and the second random access preamble length are provided with the configuration information in a master information block message, in a system information block message, or any combinations thereof.

Aspect 21: The method of any of aspects 19 through 20, wherein the configuration information indicates a transmit power for the first random access request based at least in part on the first random access occasion being included in the second subset of random access occasions, wherein the first subset of random access occasions are configured with a different transmit power than the second subset of random access occasions.

Aspect 22: The method of any of aspects 13 through 21, wherein the configuration information includes information for two or more random access occasions having different random access preamble lengths within a same slot, a same set of frequency resources, or both.

Aspect 23: The method of aspect 13, wherein the configuration information includes a first set of random access preambles associated with a first SBFD slot format and a second set of random access preambles associated with a second SBFD slot format, and wherein a random access preamble is selected for a random access request based at least on part on whether a slot for transmission of the random access request is associated with the first SBFD format or the second SBFD format.

Aspect 24: The method of aspect 23, wherein the first set of random access preambles have a different preamble length than the second set of random access preambles.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a network entity, comprising a processor; memory coupled with the processor; and instructions stored in the memory and executable by the processor to cause the apparatus to perform a method of any of aspects 13 through 24.

Aspect 29: An apparatus for wireless communication at a network entity, comprising at least one means for performing a method of any of aspects 13 through 24.

Aspect 30: A non-transitory computer-readable medium storing code for wireless communication at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources; and
    transmitting, in a first random access occasion subsequent to a channel access procedure for a shared radio frequency spectrum band used for communications with the cell, a first random access request having the second random access preamble length based at least in part on the first random access occasion being associated with full-duplex communications of the cell.

2. The method of claim 1, further comprising:
    determining a random access transmit power for the first random access request based at least in part on a full-duplex power offset associated with the first random access occasion, and wherein the first random access request is transmitted using the random access transmit power.

3. The method of claim 2, wherein the full-duplex power offset mitigates self-interference associated with the full-duplex communications of the cell.

4. The method of claim 2, wherein the full-duplex power offset is received with the configuration information in a master information block message, in a system information block message, or any combinations thereof.

5. The method of claim 1, further comprising:
    determining a random access transmit power for the first random access request based at least in part on an open-loop power control procedure for random access transmissions; and
    selecting the second random access preamble length for the first random access request based at least in part on the random access transmit power being at or above a threshold value, wherein the first random access preamble length is selected for one or more random access requests based at least in part on the random access transmit power being below the threshold value.

6. The method of claim 5, wherein the threshold value for the random access transmit power is based at least in part on a regulatory maximum transmit power for communications in a shared or unlicensed radio frequency spectrum band.

7. The method of claim 1, wherein the configuration information includes an indication of a first subset of random access occasions associated with the first random access preamble length and a second subset of random access occasions associated with the second random access preamble length, and wherein the second random access preamble length is selected for the first random access request based at least in part on the first random access occasion being included in the second subset of random access occasions.

8. The method of claim 7, wherein the first random access preamble length and the second random access preamble length are provided with the configuration information in a master information block message, in a system information block message, or any combinations thereof.

9. The method of claim 7, further comprising:
    determining a transmit power for the first random access request based at least in part on the first random access occasion being included in the second subset of random access occasions, wherein the first subset of random access occasions are configured with a different transmit power than the second subset of random access occasions.

10. The method of claim 1, wherein the configuration information includes information for two or more random access occasions having different random access preamble lengths within a same slot, a same set of frequency resources, or both.

11. The method of claim 1, wherein the configuration information includes a first set of random access preambles associated with a first subband full-duplex (SBFD) slot format and a second set of random access preambles associated with a second SBFD slot format, and wherein a first random access preamble is selected for the first random access request based at least on part on whether a slot associated with the first random access occasion is associated with the first SBFD format or the second SBFD format.

12. The method of claim 11, wherein the first set of random access preambles have a different preamble length than the second set of random access preambles.

13. A method for wireless communication at a network entity, comprising:
transmitting configuration information to a user equipment (UE) that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources; and
receiving, from the UE in a first random access occasion subsequent to a channel access procedure for a shared radio frequency spectrum band used for communications with the UE, a first random access request having the second random access preamble length based at least in part on the first random access occasion being associated with full-duplex communications of the cell.

14. The method of claim 13, wherein the configuration information indicates a random access transmit power for the first random access request that is based at least in part on a full-duplex power offset associated with the first random access occasion.

15. The method of claim 14, wherein the full-duplex power offset mitigates self-interference associated with the full-duplex communications of the cell.

16. The method of claim 14, wherein the full-duplex power offset is transmitted with the configuration information in a master information block message, in a system information block message, or any combinations thereof.

17. The method of claim 13, wherein the configuration information indicates a random access configuration having an open-loop power control procedure that provides a random access transmit power for the first random access request, and wherein the first random access preamble length is used for random access requests when the random access transmit power is below a threshold value, and the second random access preamble length is used for random access requests when the random access transmit power is at or above the threshold value.

18. The method of claim 17, wherein the threshold value for the random access transmit power is based at least in part on a regulatory maximum transmit power for communications in a shared or unlicensed radio frequency spectrum band.

19. The method of claim 13, wherein the configuration information includes an indication of a first subset of random access occasions associated with the first random access preamble length and a second subset of random access occasions associated with the second random access preamble length, and wherein the second random access preamble length is selected for the first random access request based at least in part on the first random access occasion being included in the second subset of random access occasions.

20. The method of claim 19, wherein the first random access preamble length and the second random access preamble length are provided with the configuration information in a master information block message, in a system information block message, or any combinations thereof.

21. The method of claim 19, wherein the configuration information indicates a transmit power for the first random access request based at least in part on the first random access occasion being included in the second subset of random access occasions, wherein the first subset of random access occasions are configured with a different transmit power than the second subset of random access occasions.

22. The method of claim 13, wherein the configuration information includes information for two or more random access occasions having different random access preamble lengths within a same slot, a same set of frequency resources, or both.

23. The method of claim 13, wherein the configuration information includes a first set of random access preambles associated with a first subband full-duplex (SBFD) slot format and a second set of random access preambles associated with a second SBFD slot format, and wherein a random access preamble is selected for a random access request based at least on part on whether a slot for transmission of the random access request is associated with the first SBFD format or the second SBFD format.

24. The method of claim 23, wherein the first set of random access preambles have a different preamble length than the second set of random access preambles.

25. An apparatus for wireless communication at a user equipment (UE), comprising:
a processor;
memory coupled with the processor; and
instructions stored in the memory and executable by the processor to cause the apparatus to:
receive configuration information associated with a cell for wireless communications, the configuration information indicates a first random access preamble length for half-duplex communications in which uplink and downlink communications of the cell occupy one or more different time resources or frequency resources, and a second random access preamble length for full-duplex communications in which uplink and downlink communications of the cell occupy at least partially overlapping time and frequency resources; and
transmit, in a first random access occasion subsequent to a channel access procedure for a shared radio frequency spectrum band used for communications with the cell, a first random access request having the second random access preamble length based at least in part on the first random access occasion being associated with full-duplex communications of the cell.

26. The apparatus of claim 25, wherein the instructions are further executable by the processor to cause the apparatus to:
determine a random access transmit power for the first random access request based at least in part on a full-duplex power offset associated with the first random access occasion, and wherein the first random access request is transmitted using the random access transmit power.

27. The apparatus of claim 25, wherein the instructions are further executable by the processor to cause the apparatus to:
determine a random access transmit power for the first random access request based at least in part on an open-loop power control procedure for random access transmissions; and
select the second random access preamble length for the first random access request based at least in part on the random access transmit power being at or above a threshold value, wherein the first random access preamble length is selected for one or more random access requests based at least in part on the random access transmit power being below the threshold value.

28. An apparatus for wireless communication at a network entity, comprising:

a processor;

memory coupled with the processor; and instructions stored in the memory and executable by the processor to cause the apparatus to:

transmit configuration information to a user equipment (UE) that indicates a first random access preamble length for half-duplex communications in which uplink and downlink communications of a cell occupy one or more different time resources or frequency resources, and a second random access preamble length for full-duplex communications in which uplink and downlink communications of the cell occupy at least partially overlapping time and frequency resources; and receive, from the UE in a first random access occasion subsequent to a channel access procedure for a shared radio frequency spectrum band used for communications with the UE, a first random access request having the second random access preamble length based at least in part on the first random access occasion being associated with full-duplex communications of the cell.

29. The apparatus of claim 28, wherein the configuration information indicates a random access transmit power for the first random access request that is based at least in part on a full-duplex power offset associated with the first random access occasion.

30. The apparatus of claim 28, wherein the configuration information indicates a random access configuration having an open-loop power control procedure that provides a random access transmit power for the first random access request, and wherein the first random access preamble length is used for random access requests when the random access transmit power is below a threshold value, and the second random access preamble length is used for random access requests when the random access transmit power is at or above the threshold value.

* * * * *